US006982514B1

(12) United States Patent
Lu et al.

(10) Patent No.: US 6,982,514 B1
(45) Date of Patent: Jan. 3, 2006

(54) ELECTROCHEMICAL DEVICES INCORPORATING HIGH-CONDUCTIVITY CONJUGATED POLYMERS

(75) Inventors: Wen Lu, Santa Fe, NM (US); Elisabeth Smela, Silver Spring, MD (US); Benjamin R. Mattes, Santa Fe, NM (US); Philip N. Adams, Santa Fe, NM (US); Guido Zuccarello, Silver Spring, MD (US)

(73) Assignee: Santa Fe Science and Technology, Inc., Santa Fe, NM (US)

( * ) Notice: Subject to any disclaimer, the term of this patent is extended or adjusted under 35 U.S.C. 154(b) by 146 days.

(21) Appl. No.: 09/863,808

(22) Filed: May 22, 2001

Related U.S. Application Data

(60) Provisional application No. 60/206,511, filed on May 22, 2000.

(51) Int. Cl.
*H02N 11/00* (2006.01)
*H02N 2/00* (2006.01)
(52) U.S. Cl. .................................... 310/300; 310/800
(58) Field of Classification Search ................ 310/300
See application file for complete search history.

(56) References Cited

U.S. PATENT DOCUMENTS

| | | | | |
|---|---|---|---|---|
| 5,210,217 | A * | 5/1993 | Albarella et al. ............ 548/527 |
| 5,556,700 | A * | 9/1996 | Kaneto et al. ............... 428/332 |
| 5,886,854 | A * | 3/1999 | Diaz et al. ............... 360/99.08 |
| 6,157,113 | A * | 12/2000 | Hunter et al. ................ 310/300 |
| 6,249,076 | B1 * | 6/2001 | Madden et al. .............. 310/363 |
| 6,326,215 | B1 * | 12/2001 | Keen ........................... 436/518 |
| 6,455,873 | B1 * | 9/2002 | Lonergan ...................... 257/40 |
| 6,468,785 | B1 * | 10/2002 | Wang et al. .............. 435/287.2 |
| 6,510,042 | B1 * | 1/2003 | Lee et al. .................... 361/502 |
| 6,555,945 | B1 * | 4/2003 | Baughman et al. .......... 310/300 |
| 6,577,039 | B2 * | 6/2003 | Ishida et al. ................. 310/300 |
| 6,587,250 | B2 * | 7/2003 | Armgarth et al. ............ 359/265 |
| 2002/0012156 | A1 * | 1/2002 | Varaprasad et al. .......... 359/273 |
| 2002/0177039 | A1 * | 11/2002 | Lu et al. ....................... 429/213 |

FOREIGN PATENT DOCUMENTS

EP    0 924 033 A2    11/1998

(Continued)

OTHER PUBLICATIONS

Huang, W., Hemphrey, B., MacDiarmid, A., "Polyaniline, a novel conducting polymer: morphology and chemistry of it oxidation and reduction in aqueous electrolyte," *J. Chem. Soc. Faraday Trans. 1*, vol. 82, 1986, pp. 2385-2400.

(Continued)

*Primary Examiner*—Tom Dougherty
(74) *Attorney, Agent, or Firm*—Samuel M. Freund; Cochran Freund & Young, LLC

(57) ABSTRACT

The present invention includes the preparation of highly conducting conjugated polymers and their use as electrochemical actuators, A typical electrochemical actuator comprises a highly conducting, conjugated polymer for the anode or the cathode, or for both the anode and the cathode; suitable conjugate polymers have a conductivity $\geq 100$ S/cm. The material may have any form, including films and fibers. A preferred shape is a strip or a fiber, where the fiber can be solid or hollow, although any shape may be used. Before use, the material may be treated, for example, by immersion in an acid, in order to dope/protonate the material or to introduce anions or to exchange the anion in the polymer for another anion. Other materials may be incorporated in the polyaniline to increase its conductivity or to provide other benefits, such as increased strength. Useful conducting polymers include monomers of anilines, pyrroles, thiophenes, phenylene vinylenes, and derivatives thereof.

4 Claims, 17 Drawing Sheets

FOREIGN PATENT DOCUMENTS

| IT | 67484 |   | 6/1989 |
|---|---|---|---|
| JP | 58-12319 | * | 7/1981 |
| JP | 1-257017 | * | 10/1989 |
| JP | 2-20586 | * | 1/1990 |
| JP | 3-153510 | * | 7/1991 |
| JP | 3-153512 | * | 7/1991 |
| JP | 4-10654 | * | 1/1992 |
| JP | 11-093827 | * | 4/1999 |
| JP | 2000-083389 | * | 3/2000 |
| JP | 2000-133854 | * | 5/2000 |
| JP | 2000-261054 | * | 9/2000 |
| WO | WO9807107 |   | 2/1998 |
| WO | PCT/GB 98/03241 |   | 1/1999 |
| WO | WO 99/24991 |   | 5/1999 |

OTHER PUBLICATIONS

Mazzoldi, A., Degl'Innocentl, C., Michelucci, M., De Rossi, D., "Actuative properties of polyaniline fibers under electrochemical stimulation," *Materials Science and Engineering C*, vol. 6, Elsevier Science, 1998, pp. 65-72.

Satoh, M., Kaneto, K., Yoshino, K., "Dependences of electrical and mechanical properties of conducting polypyrrole films on conditions of electrochemical polymerization in an aqueous medium," *Synthetic Metals*, vol. 14, Elsevier Sequoia, Netherlands, 1986, pp. 289-296.

Kaneko, M., Kaneto, K., "Electrochemomechanical deformation of polyaniline films doped with self-existant and giant anions," *Reactive and Functional Polymers*, vol. 37, Elsevier Science, 1998, pp. 155-161.

Lewis, T.W., Spinks, G.M., Wallace, G.G., De Rossi, D., Pachetti, M., "Development of an all polymer electrochemical actuator," pp. 520-521.

Pei, Q., Inganas, O., Lundstrom, I., "Bending bilayer strips built from polyaniline for artificial electrochemical muscles," *Smart Mater. Struct.*, vol. 2, IOP Publishing Ltd., United Kingdom, 1993, pp. 1-6.

Smela, E., Inganas, O., Lundstrom, I., "Controlled folding of micrometer-size structures," *Science*, vol. 268, Jun. 23, 1995, pp. 1735-1738.

Otero, T.F., Rodriguez, J., Angula, E., Santamaria, C., "Artificial muscles from bilayer structures," *Synthetic Metals*, vols. 55-57, Elsevier Sequola, 1993, pp. 3713-3717.

Kaneko, M., Fukui, M., Takashima, W., Kaneto, K., "Electrolyte and strain dependences of chemomechanical deformation of polyaniline film," *Synthetic Metals*, vol. 84, Elsevier Science, 1997, pp. 795-796.

Chiarelli, P., Della Santa, A., De Rossi, D., Mazzoldi, A., "Actuation properties of electrochemically driven polypyrrole-free-standing films," *Journal of Intelligent Material Systems and Structures*, vol. 6, Jan. 1995, pp. 32-37.

Takashima, W., Fukui, M., Kaneko, M., Kaneto, K., "Electrochemomechanical deformation of polyaniline films," Jul. 1995, pp. 3786-3789.

Monkman, A.P., Adams, P., "Optical and electronic properties of stretch-oriented solution-cast polyanillne films," *Synthetic Metals*, vol. 40, Elsevier Sequoia, Netherlands, 1991, pp. 87-96.

Kaneko, M., Kaneto, K., "Electrochemomechanical deformation in polyaniline and poly(o-methoxyaniline)," vol, 102, *Synthetic Metals*, Elsevier Science, 1999, pp. 1350-1353.

Della Santa, A., De Rossi, D., Mazzoldi, A., "Performance and work capacity of a polypyrrole conducting polymer linear actuator," *Synthetic Metals*, vol. 90, Elsevier Science, 1997, pp. 93-100.

Takashima, W., Uesugi, T., Fukui, M., Kaneko, M., Kaneto, K., "Mechanochemoelectrical effect of polyaniline film," *Synthetic Metals*, vol. 85, Elsevier Science, 1997, pp. 1395-1396.

Okabayashi, K., Goto, F., Abe, K., Yoshida, T., "Electrochemical studies of polyaniline and its application," *Synthetic Metals*, vol. 18, Elsevier Sequoia, Netherlands, 1987, pp. 365-370.

Adams, P.N., Devasagayam, P., Pomfret, S.J., Abeil L., Monkman, A.P., "A new acid-processing route to polyaniline films which exhibit metallic conductivity and electrical transport strongly dependent upon intrachain molecular dynamics," *J. Phys.: Condens. Matter*, vol. 10, IOP Publishing Ltd., United Kingdom, 1998, pp. 8293-8303.

Pomfret, S.J., Adams, P.N., Comfort, N.P., Monkman, A.P., "Advances in processing routes for conductive polyaniline fibres," *Synthetic Metals*, vol. 101, Elsevier Science, 1999, 724-725.

Pomfret, S.J., Adams, P.N., Comfort, N.P., Monkman, A.P., "Electrical and mechanical properties of polyaniline fibres produced by a one-step wet spinning process," *Polymer*, vol. 41, Elsevier Science Ltd., 2000, 2265-2269.

* cited by examiner

ELECTROCHEMICAL DEVICES INCORPORATING HIGH-CONDUCTIVITY CONJUGATED POLYMERS

CROSS REFERENCE TO RELATED APPLICATIONS

The present application claims the benefit of Provisional Application Ser. No. 60/206,511 which was filed on May 22, 2000.

STATEMENT REGARDING FEDERALLY SPONSORED RESEARCH AND DEVELOPMENT

This invention was made with government support under Contract No. MDA972-99-C-0004 awarded to Santa Fe Science & Technology, Inc. of Santa Fe, N. Mex. by DARPA. The government has certain rights in the invention.

FIELD OF THE INVENTION

The present invention relates generally to electrochemical devices, such as actuators, batteries, supercapacitors, sensors, light-emitting electrochemical cells, photoelectrochemical solar cells, and electrochromic cells and, more particularly, to electrochemical devices which include a high-conductivity conjugated polymer.

BACKGROUND OF THE INVENTION

Actuators are capable of changing form or shape in response to a stimulus or condition and, thereby, of affecting a transformation or action. Actuation is also accomplished by piezoelectric materials, ion-exchange resins and shape memory alloys. There is a need for reducing the weight of actuators, the noise associated with actuators and the currents and voltages required for actuator operation, and for increasing the strains that actuators can achieve. This is especially true for biomedical devices and equipment. For example, for some medical equipment directly in contact with patient tissues it is desirable to use actuators made from soft materials that do no damage to these tissues. In general, actuators which are light-weight and generate smooth motions are desired.

Recent advances in actuator technology include the use of polymers as a constituent of actuator devices. Of particular interest are those polymeric systems that operate in an electromechanical mode; that is, transform an electrical signal into a mechanical motion. The family of conjugated polymers which includes polyaniline and polypyrrole have been found to be particularly useful since for these materials volume change is an electrochemical phenomenon and, therefore, involves both electrical phenomena, such as resistance and capacitance, and chemical phenomena, such as oxidation and reduction. See, e.g., 1. Chiarelli, 1992; 2. Kaneto, 1996; and 3. Kaneto, 1999. The polymer in a conjugated, polymer-based actuator changes its oxidation level and thereby its volume with the application of an electrochemical potential to the actuator. When the oxidation level changes, ion transport into or out of the polymer, solvent transport in/out of the polymer, polymer chain configuration changes, and changes in interactions between polymer chains all contribute to volume change.

The electrochemical oxidation and reduction of emeraldine salt in aqueous acids is thought to be accompanied by proton, electron, and anion transfer. See, e.g., 4. Huang, 1986. The electrochemical oxidation of the polyaniline salt form to the pernigraniline form occurs with the removal of protons, electrons, and anions from the corresponding nitrogen atom. Similarly, the electrochemical reduction of the polyaniline salt form to the leucoemeraldine form is thought to occur below pH=0 with the addition of both protons and electrons to the corresponding nitrogen atom. Above pH=0, the reduction is thought to occur with the addition of electrons and the loss of anions to the corresponding nitrogen atom. The change in the polyaniline physical structure, from the phenyl to the quinoid structure of the benzene ring, is induced during oxidation with a corresponding reversal for reduction. The electrochemical oxidation of polypyrrole in aqueous solutions can be accompanied by anion and/or cation transport, as well as electron and solvent transport. Oxidation of polypyrrole occurs with the removal of electrons and either the insertion of anions or the de-insertion of cations, or both.

It is difficult to achieve high conductivity in conjugated polymers. High conductivity has been reported for pure polyacetylene with aligned polymer chains; however, this material is unstable in an air atmosphere. For the two materials typically used for actuators, polyaniline and polypyrrole, conductivities are generally low (less than a few tens of Siemens/cm (S/cm)). For example, the polyaniline fiber actuators reported in 5. Mazzoldi, 1998 had a conductivity of 3 S/cm. The highest previously reported conductivity for polypyrrole was 300 S/cm for polypyrrole doped with tosylate See, e.g., 6. Satoh, 1986).

Generally, polyaniline is prepared by mixing aniline, a protonic acid and a polymerization agent or initiator in aqueous media at a temperature above $-5°$ C., and recovering the resultant product from the mixture. Representative examples of such preparatory methods and the polyanilines made therefrom are shown in U.S. Pat. Nos. 5,147,913 and 5,177,187. Specifically, a polymerization agent, such as ammonium peroxydisulfate, is presented in a protonic acid solution, such as a 1 m HCl solution, and this solution is added to aniline also dissolved in 1 M HCl. The resulting solution maintained at a chosen reaction temperature, and the precipitate thus formed is collected and washed with 1 M HCl to yield emeraldine hydrochloride. This salt may be converted to the emeraldine base by treatment with 0.1 M $NH_4OH$. Films can be cast from the emeraldine salt by dissolving the salt in NMP. An emeraldine base film may be converted to the emeraldine salt form by immersing the film in an acid, such as 1 M HCl. This method produces films having low conductivity (<30 S/cm). Such films are too resistive to undergo complete and timely oxidation/reduction without a conductive layer in contact with one film surface. Stretching these materials is known to increase their conductivity still further.

If a voltage is applied to an electrode in electrical contact with one end of a conjugated polymer element, the voltage along the polymer decreases with distance from the electrode along the length of the conjugated polymer element if the conjugated polymer material has a low conductivity. Material further from the electrode experiences a smaller potential and is thus at a different oxidation level than material closer to the electrode. This is illustrated in FIG. 1. The drop in potential is schematically illustrated by the shading gradation and is also shown by the numerals. If the material is very resistive, then the material may not even be sufficiently electroactive to undergo oxidation/reduction reactions without a metal backing, film, or contact, along its length. A film with a metal layer backing is shown in FIG.

2. The drop in potential is again schematically illustrated by the shading gradation and is also shown by the numerals.

Because of the low conductivity (<400 S/cm for the discussion hereinbelow) of most conjugated polymer materials, actuators utilizing these materials generally include a metal backing layer (FIG. 2) (See, for example, 7. Kaneko, 1998; 8. Lewis, 1997; 9. Pei, 1993; and 10. Smela, 1995.). This metal layer can be generated on a film using a number of procedures: (1) thermal evaporation; (2) sputtering; (3) gilding; (4) casting the polymer onto a metal substrate or onto a substrate already coated with the metal; and (5) electrochemically depositing the polymer onto a metal. However, such metal layers are detrimental to the operation of the actuator because the metal (a) may corrode or react in the electrolyte; (b) may delaminate; and (c) may crack. Furthermore, such metal layers add processing steps and expense to the production of actuators.

Metal layers are also incompatible with linear actuation; that is, expansion and contraction along the length of the actuator, because such layers induce bending (FIG. 3). A bending actuator cannot generate as much force as a linear actuator because some of the energy is lost in the transformation from linear motion to angular motion and because of considerations of torque. Nevertheless, almost all conjugated polymer actuators make use of bending layers (See, for example, 8. Lewis, 1997; 9. Pei, 1993; 10. Smela, 1995; and 11. Otero, 1993). There are a few examples of linear conjugated polymer actuators; however these include a metal layer with the exception of: 5. Mazzoldi, 1998; 12. Kaneko, 1997; 13. Chiarelli, 1995; and 14. Takashima, 1995.

In Reference 12. Kaneko, 1997, polyaniline films were cast from solutions of emeraldine base (EB), and polyaniline rods were prepared from EB by gelation. The films and rods were then protonated using aqueous acids. The conductivity of these articles was not specified, indicating that this characteristic was not important. The highest conductivity reported to date for polyaniline films prepared in the EB form and subsequently protonated is 70 S/cm (See, 15. Monkman, 1991). With a conductivity of 70 S/cm, actuators experience a drop in applied potential as schematically illustrated in FIG. 1 hereof, and as actually shown by the present inventors for a film having a conductivity of 30 S/cm (See FIG. 6 hereof). The effects of low conductivity can be seen in the cyclic voltammogram of a rod shown in figure 1 of Reference 12. (Kaneko, 1997): that is, the broad peaks show that the entire film is not simultaneously undergoing oxidation or reduction, but rather that there is a distribution of times and potentials at which oxidation occurs, a result of low conductivity. For polyaniline films in contact with a platinum foil cycled in aqueous electrolytes, as is shown in the upper part of fig. 3 of Reference 16 (Kaneko, 1999), the peaks are narrow. A higher polymer conductivity permits the entire sample to be simultaneously oxidized and reduced, thereby increasing the actuation speed, which is beneficial for devices utilizing actuators. The effects of low conductivity can also be observed by comparing the measured currents for the free-standing rods of fig. 1 of Reference 12. (Kaneko, 1997) and those for films disposed on a platinum foil of fig. 3 of Reference 16 (Kaneko, 1999). In the former, the sample was 23 mm long and had a diameter of 3 mm, giving a volume of 163 mm$^3$ (since the rod was formed from a 10% gel, the actual volume of polyaniline was 16.3 mm$^3$), and the current was observed to be 12 mA. In the latter reference, the sample size was 3×3×0.03 mm$^3$, or 0.27 mm$^3$, and the current was observed to be 1.5 mA. The size ratio was therefore 16.3:0.27=60, but the current ratio was 12:1.5=8. Had rods having higher conductivity been used, the current would have been higher (more of the film would have been oxidized and reduced), and a larger length change would have been observed. The Kaneto patent (Reference 3. Kaneto, 1999) also teaches the use of metal electrodes to ensure that a uniform potential is applied to the actuator device.

Reference 13 (Chiarelli, 1995) describes the use of free-standing polypyrrole films in actuators. These films were commercially obtained and had an electrical conductivity of 150 S/cm. A sample length of 9 cm was used and low sample conductivity is evident from fig. 3 of Reference 13. The oxidation and reduction peaks of the free-standing films in acetonitrile were separated by more than 1 V; by contrast, when polypyrrole films are in contact with a metal, typical peak separation in this solvent is approximately 0.25 V, as shown in fig. 1 of Reference 11. Otero, 1993. The peaks in Reference 13 are also poorly defined, small, and broad in comparison with those shown in Reference 11. Large peak separation not only requires greater operating voltages, a disadvantage for actuator devices, but also results in a lower efficiency: the net amount of energy required to power the devices depends directly on peak separation. Therefore, higher conductivity is desirable. Reference 17. Della Santa, 1997, states: "the active part of the sample is confined to a 30 mm long portion, next to the gold electrode", confirming the low conductivity of the films in Reference 13. However, neither Reference 13 nor Reference 17 teaches that a higher sample conductivity would be beneficial.

The linear actuator described in Reference 5 (Mazzoldi, 1998) had, as mentioned hereinabove, a conductivity of only approximately 3 S/cm. However, in order to improve the performance of the actuator, the authors suggest decreasing the fiber diameter; no mention was made of improving the conductivity.

Reference 14. Takashima, 1995 describes the measurement of the dimensional changes of stretched polyaniline films. No film conductivity was reported; however, the required slow cycling speed of 1 mV/sec is indicative of a low conductivity. Nor was conductivity discussed in Reference 18. Takashima, 1997; in both references, films were cast in the EB form and subsequently doped which results in low conductivity.

In organic electrolytes, oxidation/reduction will not take place if the conjugated polymer is an anion exchange material and the anion is insoluble in the organic electrolyte (See, e.g., 19. Okabayashi, 1987). During the preparation of highly conducting polyaniline actuators, one anion that may be used is 2-acrylamido-2-methyl-1-propanesulfonate (AMPSA); however, anions like AMPSA are insoluble in organic solvents such as propylene carbonate (PC), a desirable solvent for use in electrochemistry.

Conjugated polymers are capable of changing a wide range of properties in response to a stimulus or condition, including color, concentration of ions, hydrophobicity/hydrophilicity, and conductivity. Electrochemical devices rely upon the application of an electrochemical potential or a current to change a property of the conjugate polymer. In what follows, the term "electrochemical devices" is understood to refer to devices in which a potential or current is used to drive chemical reactions, particularly oxidations and reductions. Conjugated polymers have also been employed as constituents of electrochromic windows, supercapacitors, photoelectrochemical solar cells, and other devices. Typical conjugated polymers used in electrochemical devices include the polyanilines, polypyrroles, polythiophenes, and polyphenylene vinylenes. Again, as in the case for actuators, if the conjugated polymer material is resistive, the material may not even be sufficiently electroactive to undergo electrochemical reactions without a metal backing, or contact, along its length, and electrochemical devices utilizing conjugated polymers generally incorporate a metal layer. Such a metal layer may be detrimental to the operation of the device because the metal may corrode or react in the electrolyte. In addition, a noble metal such as gold or platinum is usually necessary, and these are expensive.

Accordingly it is an object of the present invention to is to provide a method for generating conjugated polymers having high conductivity.

Another object of the present invention is to provide actuators using conjugated polymers which do not require a metal layer along their length, thereby being useful for linear extension actuators.

Yet another object of the invention is to provide a method for treating highly conducting conjugated polymers such that they can be used in organic electrolytes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the electrochemical actuator hereof includes a conjugated polymer having a conductivity of $\geqq 100$ S/cm.

Preferably, the conjugated polymer includes polyaniline and a chosen anion.

It is also preferred that the chosen anion is exchanged for an anion soluble in an organic electrolyte when the electrochemical device is to be used in organic electrolytes.

In another aspect of the present invention in accordance with its objects and purposes the method for maintaining the high conductivity of a conjugated polymer in an organic electrolyte hereof includes exchanging the anion associated with the conjugated polymer with an anion which is soluble in the organic electrolyte.

Benefits and advantages of the invention include actuators that are light weight, quiet, soft, inexpensive, and require only low voltages for operation. Additionally, a more uniform potential can be applied to the entire conjugated polymer component and, therefore, the response of the actuator can be shortened, the efficiency increased, and the extent of volume change can be increased. Moreover, the polymeric materials do not require a metal layer along their length for use in other electrochemical devices. Aqueous electrolytes are no longer required for operation; in particular, actuators and other electrochemical devices that utilize organic solvent electrolytes, solid polymer electrolytes, or gel electrolytes can be produced. In the area of conjugated polymer actuators, the present invention permits operation of artificial muscle-like films or fibers tens or hundreds of centimeters in length, instead of the 3 cm length that have been previously reported.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Briefly, the present invention includes the preparation of highly conducting conjugated polymers and their use in actuators and other electrochemical devices. A typical electrochemical device comprises a highly conducting conjugated polymer for the anode or the cathode, or for both the anode and the cathode; that is, a conjugate polymer having a conductivity $\geq 100$ S/cm, preferably $\geq 100$ S/cm, measured using the 4-point probe method. The material may have any thickness, such as, for example 1 Å to 10 m, including all values in between and all ranges in between. Thicker and thinner layers may be used. The material need not have a uniform thickness. The material may have any form, including films and fibers. A preferred shape is a strip or a fiber, where the fiber can be solid or hollow, although any shape may be used. Before use the material may be treated, for example, by immersion in an acid, in order to dope/protonate the material or to introduce anions or to exchange the anion in the polymer for another anion. Other materials may be incorporated in the polyaniline to increase its conductivity or to provide other benefits, such as increased strength. Examples of materials that may be added include carbon nanotubes, C$_{60}$, gold nanoparticles, other metal nanoparticles, TiO$_2$ nanoparticles, other oxide nanoparticles, polymethylmethacrylate, polycarbonate, nylon, and other thermoplastic polymers.

Figure 1:
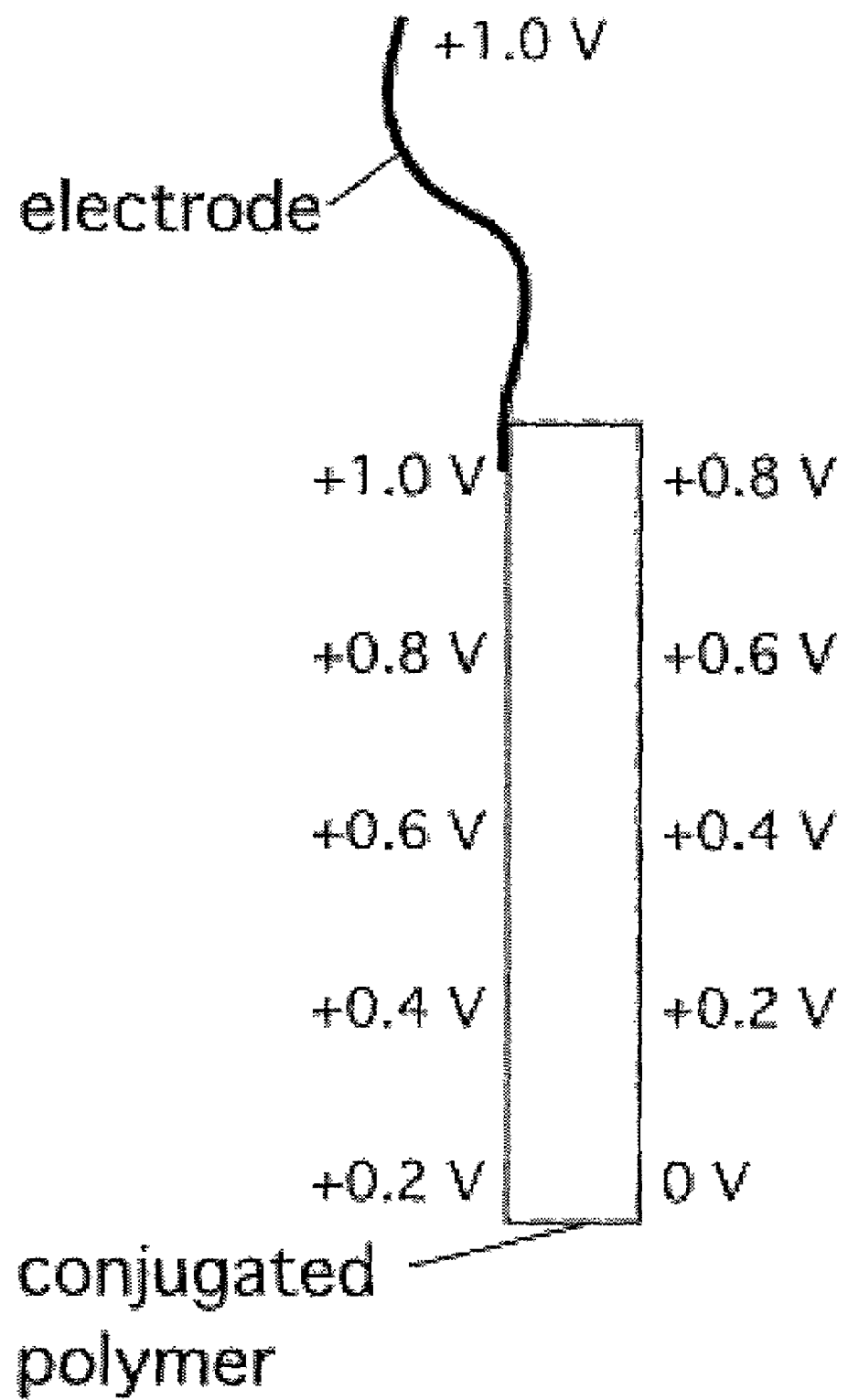
FIG. 1 is a schematic representation of a resistive conjugated polymer in contact with an electrode.
Figure 2:
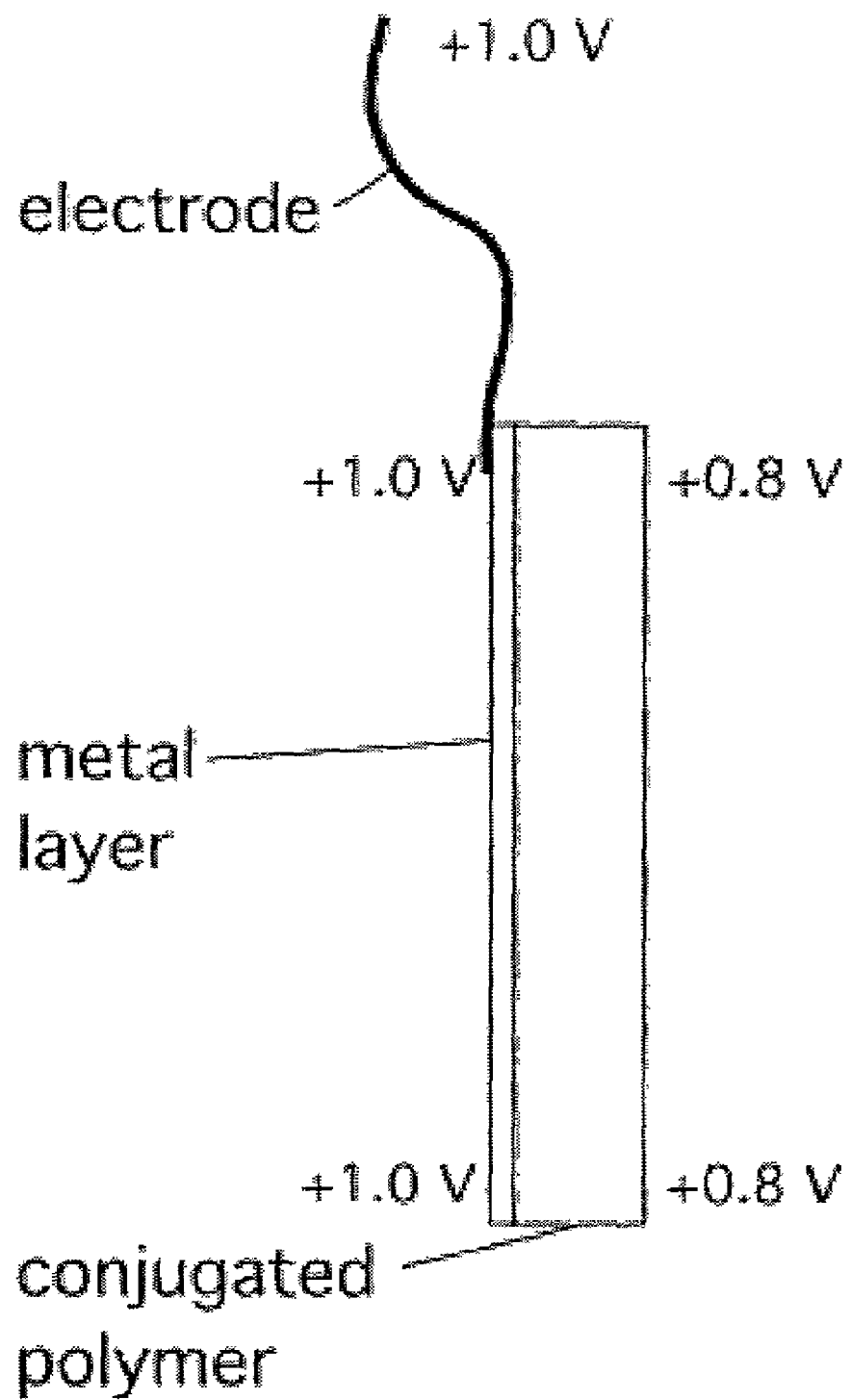
FIG. 2 is a schematic representation of a resistive conjugated polymer having a metal backing.
Figure 3:
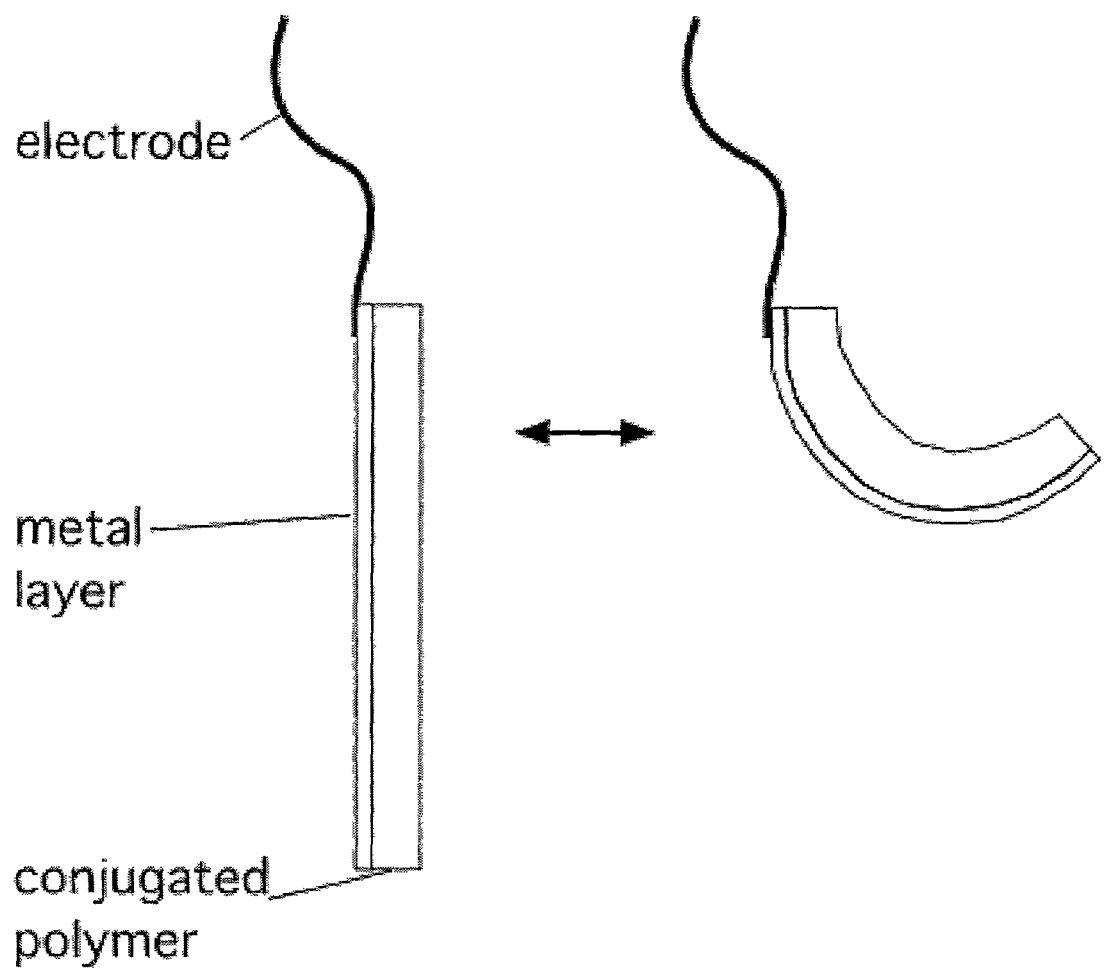
FIG. 3 is a schematic illustration of a metal layer inducing bending when a conjugated polymer layer changes volume.
Figure 4A:
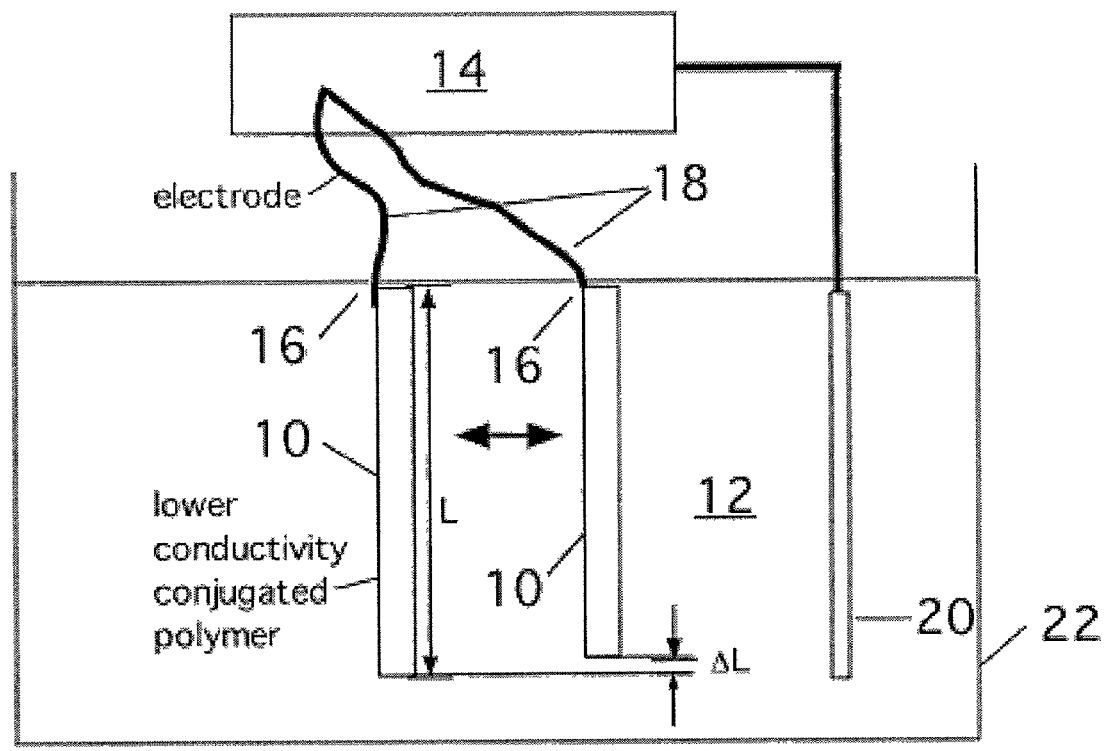
FIG. 4a is a schematic representation of linear actuation for a low-conductivity actuator compared with the linear actuation for a high-conductivity actuator shown in FIG. 4b.
Figure 4B:
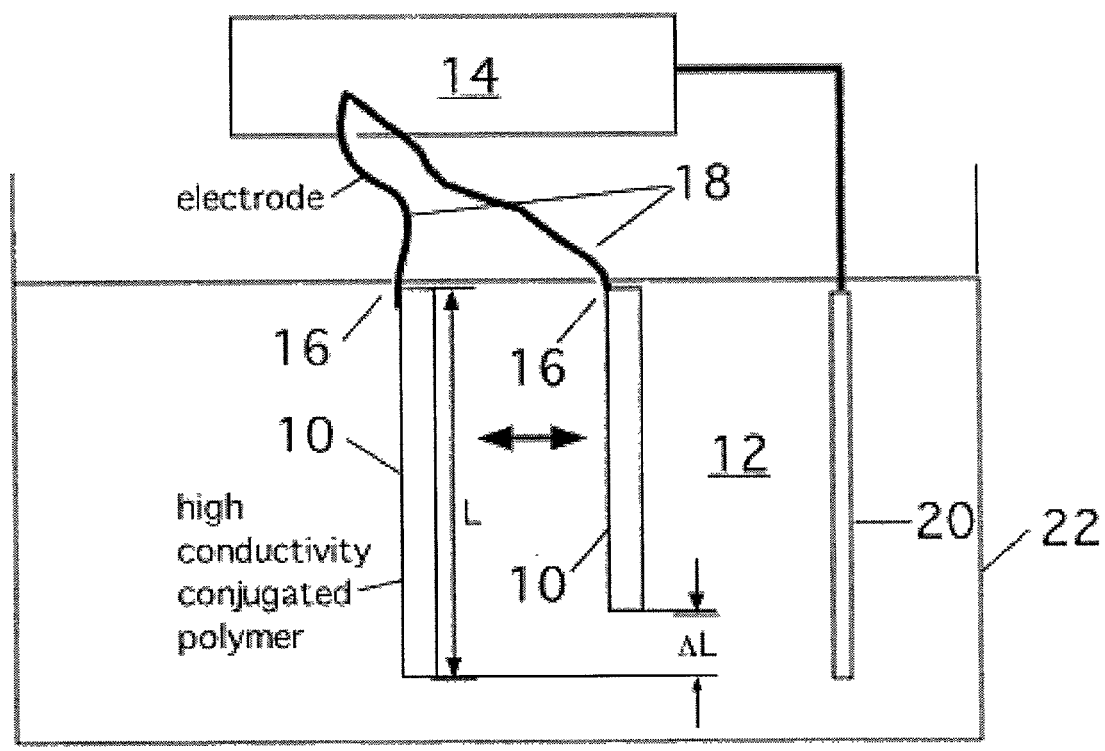

Reference will now be made in detail to the present preferred embodiments of the invention as are illustrated in the accompanying drawings. Similar or identical structure will be identified using identical callouts. Turning now to FIG. 4, FIG. 4a is a schematic representation of linear actuation for a low-conductivity actuator compared with the linear actuation for a high-conductivity actuator shown in FIG. 4b. The longer the conjugated polymer, the more important low conductivity becomes; that is, the length change is greater for the high-conductivity polymer actuator. For the resistive polymer actuator (FIG. 4a), the end of the actuator away from the electrode undergoes less volume change than that closest to the electrode. Conjugated polymer fibers having a length of more than approximately 3 cm require high conductivity if their use in actuators is intended. Shown in FIG. 4a and FIG. 4b are conjugated polymer strip, 10, having length L, immersed in electrolyte, 12, and placed in electrical connection with voltage supply, 14, by means of electrical contact, 16, and wire, 18. Electrode, 20, immersed in electrolyte 12 is also placed in electrical contact with voltage supply 14 to complete the electrical circuit. The electrolyte is contained in vessel, 22. In FIG. 4a and FIG. 4b the shorter polymer electrodes, also labeled 10, are shown solely for the purpose of illustration of the shortening of the length of the polymer electrode L by ΔL when the identical voltage is applied to electrode 10 for a polymer having some resistance, for example, having a conductivity S~100 S/cm, as to a polymer having much larger conductivity, for example, S$\geq$400 S/cm, respectively.

Useful conducting polymers include monomers of anilines, pyrroles, thiophenes, and phenylene vinylenes, and is preferably a homopolymer of these monomers (polyaniline, polypyrrole, polythiophene, polyphenylenevinylene). Derivatives of these monomers can also be used. Any derivative that produces a conducting polymer can be used. Such derivatives include the C1–C10 alkyl, C1–C10 alkoxy-, halo-, nitro-, cyano-, ester-, etc. substituted monomers. These monomers are commercially available or made by simple organic reactions well within the skill of the ordinary artisan. Mixtures of monomers may be used. The conducting polymer has a conductivity of greater than or equal to 400 S/cm, including all conductivity values above this and all ranges above this.

Suitable conducting polymers are prepared using processable sulfonic acids. The conducting polymer is most preferably polyaniline processed with 2-acrylamido-2-methyl-1-propanesulfonic acid (AMPSA) as described in (20. Adams, 1998), which is incorporated herein in its entirety, camphor sulfonic acid (CSA), and di(2-ethylhexyl) phthalate-4-sulfonic acid (DEHEPSA).

The invention further includes methods for treating the high conductivity conjugated polymer to exchange an incorporated doping anion with a second, different doping anion. In a first method, the anion is exchanged by placing the highly conducting polymer into a solution containing a different anion. In a second method, the high conductivity conducting polymer is immersed in a basic solution; that is, a solution with a pH higher than the pK$_a$ of the sample, and then the sample is subsequently immersed in an acidic solution; that is, a solution having a pH lower than the pK$_a$ of the sample, and containing a different anion. In a third method, the high conductivity sample is electrochemically cycled in a solution containing a different anion.

For subsequent operation of the highly conducting conjugated polymer in an organic electrolyte, the second anion is preferably soluble in organic electrolytes. Examples of soluble anions include ClO$_4$, ClO$_3$, CF$_3$COO, trifluoromethanesulfonate, bis(trifluoromethanesulfonyl)imide, Br, I, I$_3$, carboxylic acid, PF$_6$, AsF$_6$, BF$_4$, alkyl sulfonates, sulfonamides, methides, and SbF$_6$.

Due to its high conductivity, a potential applied to the conjugated polymer will be applied substantially equally to the whole of the conjugated polymer. This decreases the applied potentials that must be applied, increases the efficiency of the device comprising the conjugated polymer, and increases the magnitude and speed of the effect brought about by the applied potential.

The exchange of an anion insoluble in organic electrolytes with a second anion that is soluble in organic electrolytes allows the highly conducting conjugated polymer to be used with organic electrolytes. The conductivity remains substantially the same after this anion exchange for the PANI/AMPSA polymer described hereinbelow.

A. Method for Producing PANI:

Polyaniline powder in the emeraldine base (EB) oxidation state with a molecular weight greater than 10$^5$ g/mol, was used for preparing films and fibers following the method described in UK Patent 2287030, the teachings of which are hereby incorporated by reference herein.

B. Method for Producing Films of PANI/AMPSA:

Films were prepared in a similar manner to the examples in Patent Application WO 99/24991, the teachings of which are hereby incorporated by reference herein. EB (0.19 g) and 2-acrylamido-2-methyl-1-propanesulfonic acid (AMPSA, 0.26 g) were ground together for five minutes in a mortar & pestle. The gray powder was dissolved in a solvent mixture of dichloroacetic acid (DCA, 5.9 g) and formic acid (23.6 g). The mixture was homogenized for five min. at ~15000 rpm using an Ultra-Turrax T25 homogenizer to give a green solution. Five glass microscope slides measuring 7.6 cm×5.1 cm were placed on a flat shelf inside an oven with an air ambient. A portion of the homogenized solution, weighing 5.3 g, was placed on each microscope slide and the oven temperature increased from ambient to 55° C. After 2 h, the slides were removed, allowed to cool back down to ambient temperature, then soaked in acetone for 15 min. to remove them from the glass substrate. The subsequent free-standing films were then cut into strips measuring approximately 7.0×0.3 cm. A soldering iron having its tip wrapped with a thin section of PTFE plastic was used as a heat source. The temperature of the tip was set to 90±10° C. by use of a Variac. The polyaniline strips were stretched by approximately 200% by gripping the narrow ends and pulling slowly over the heat source. This procedure is well known to those having skill in the art as zone drawing, and has the effect of aligning the polymer chains approximately parallel to the stretch direction, thereby increasing the tensile strength, Young's modulus, and electrical conductivity of the film along the alignment axis.

C. Method for Producing Fibers of PANI/AMPSA:

Fibers were prepared according to the method outlined in WO 99/24991. EB (4.22 g) and AMPSA (5.78 g) were ground together for five minutes in a mortar & pestle. The gray powder was then placed inside a glove bag together with DCA (190 g), and the bag was filled with nitrogen gas. The powder was added gradually to the DCA solvent and homogenized as described above. The thick solution was then sealed in what is known to those having skill in the art as a dope pot, and transferred to a fiber spin line. A nitrogen pressure of 100 psi was applied to one end of the dope pot. The other end of the dope pot was attached to a gear pump. The pumped spin solution was passed through 240 and 140 $\mu$m filters before being extruded through a 250 $\mu$m diameter spinneret into a 2-butanone coagulation bath. The nascent fiber was removed after approximately 10 min., allowed to dry overnight, and then stretched over a hot pin at 90° C., as described previously for the films. Hollow fibers as well as solid fibers can be produced.

D. Method for Measuring Conductivity and Film Dimensions:

For electrical conductivity measurements of films, four parallel platinum wires were used for a conductivity probe. The separation between each wire was 0.25 cm. A Hewlett Packard 3478A multimeter was used for 4-wire resistivity (also known as four-point probe) measurements. The electrical conductivity of the polyaniline strips was measured as follows: The width (w, in cm) and thickness (t, in cm) of a strip were measured in 5 places along the length of the strip using a micrometer. The maximum and minimum width and thickness were then taken. The strip was placed across the 4 wires so that a current flowing between the outer two wires would run parallel to the long axis. The potential drop over 0.25 cm would then be measured across the two inner wires. A rubber block, weighing 180 g, was placed on top of the strip to ensure adequate pressure contact between the sample and the 4 wires. The resistance value was noted at 5 different spots along the length of each strip. The maximum and minimum value of the resistance (R, in $\Omega$) were then taken. The electrical conductivity ($\sigma$ in Scm$^{-1}$ or $\Omega^{-1}$cm$^{-1}$) could then be calculated by use of the following equation, using the highest and lowest values of w, t, and R for the error:

$$\sigma = 0.25/(w \times t \times R)$$

Typical values for an unstretched film were: w=0.22 to 0.24 cm, t=0.0019 to 0.0021 cm, R=3.35 to 3.81 $\Omega$, giving a value for $\sigma$=154±24 Scm$^{-1}$ (or 150±24 Scm$^{-1}$ after rounding off to 2 significant figures). Typical values for a stretched film were: w=0.20 to 0.22 cm, t=0.0016 to 0.0020 cm, R=1.16 to 1.60 $\Omega$, giving a value for $\sigma$=514±159 Scm$^{-1}$ (or 510±160 Scm$^{-1}$ after rounding off to 2 significant figures). Conductivity measurements for fibers were made in a similar manner to the films, except the fiber diameter was measured using a micrometer and divided by 2 to give the radius (r, in cm). The conductivity was then calculated using the following equation:

$$\sigma = 0.25/(R \times \pi r^2)$$

Typical values for a drawn fiber were: r=0.0035 to 0.0040 cm, R=7.50 to 8.20 $\Omega$, giving C=736±130 Scm$^{1}$ (or 740±130 Scm$^{-1}$ after rounding off to 2 significant figures).

E. Method for Recording Cyclic Voltammograms:

For electrochemistry, a 3-electrode configuration was used: the working electrode was the sample, contacted by a Pt clamp; the counter electrode was a Pt wire 1.5 mm in diameter; and the reference electrode was Ag/AgCl (from BAS). The three electrodes were immersed in the electrolyte, and an EcoChemie pgstat30 was used to control the applied potential. Cyclic voltammograms were recorded by ramping the potential linearly, at typically 10 mV/s, between the first and second vertex potentials, typically −0.25 and +0.5 V (vs. Ag/AgCl).

F. Method for Measuring Length Change:

For force and length change measurements, an Aurora Scientific Inc. dual-mode lever arm system, model 300B, was used. The instrument measured both the position of the arm and the force required to maintain a position, allowing both isotonic and isometric measurements to be performed. In isotonic measurements, a fixed force was applied to the conjugated polymer sample, and the arm position, corresponding to sample length, was recorded. The position was measured as a function of potential during cyclic voltammetry. The sample was clamped on the bottom end to a post, and on the inside of the clamp it was contacted by a platinum foil. This contact was connected to the working electrode of the potentiostat. The counter and reference electrodes were immersed in the electrolyte as described above. The sample was attached on the top end to the arm using a piece of adhesive tape. The upper portion of the sample, approximately 2 cm in length, was in the air, and only the lower portion, approximately 1 cm, was immersed in the electrolyte.

G. Method for Measuring Bending:

For bending measurements, a conjugated polymer strip with a gold backing was partially immersed into the electrolyte. The sample was contacted using a gold-plated alligator clamp without teeth. The sample was imaged using a video camera, and the sample was positioned so that it was viewed edge-on. The image was displayed using a TV monitor. A transparent protractor was placed over the sample image on the TV screen so that bending angles could be measured to an accuracy of ~1 degree. The bending angle was recorded manually during cyclic voltammetry at regular voltage intervals.

H. Method for Gilding Films:

Polyaniline was gilded as follows. A piece several cm in length and width was cut from a film. PANI powder was dissolved in NMP to make a 2 wt % solution to be used as a conducting glue. The 2% PANI/NMP solution was applied to one side of the PANI film, and a small sheet of gold leaf was applied over that. The assembly was dried on a hot plate at 50 degrees C. for ~1.5 h. For some gilded samples, the assembly was then soaked in 10% HCl for ~30 min., another sheet of Au leaf was applied with additional 2% PANI/NMP, and the assembly allowed to dry on a hot plate at 50° C. for 24 h.

It has been found by the present inventors that the following acids may be used to replace AMPSA for the purpose of preparing high-conductivity conjugated polymers: 2-Acrylamidopropanesulfonic acid, 2-Acrylamido-2-methylpropanesulfonic acid, 2-Methacrylamido-2-methylpropanesulfonic acid, 2-Acrylamidobutanesulfonic acid, 3-Acrylamidobutane-2-sulfonic acid, 3-Acrylamido-2,3-dimethylbutane-2-sulfonic acid, 2-Acrylamido-2,4,4-trimethylpentanesulfonic acid, 2-Acrylamido-2-phenylethanesulfonic acid, 2-Acrylamido-2-phenylpropanesulfonic acid, 2-Acrylamido-2-tolylethane sulfonic acid, 2-Acrylamido-2-pyridylethane sulfonic acid, [3-[(1,1-Dimethyl-hydroxyethyl)amino] -2-hydroxypropanesulfonic acid], [3-(Cyclohexylamino)-2-hydroxy-1-propanesulfonic acid, 3-[N,N-Bis(hydroxyethyl)amino]-2-hydroxypropanesulfonic acid, [N-(2-Hydroxyethyl)piperazine-N'-2-hydroxy propanesulfonic acid], 3-(N-Morpholino)-2-hydroxypropanesulfonicsulfonic acid, piperazine-N,N'-bis(2-hydroxypropanesulfonic acid), and 3-[N-tris-(Hydroxymethyl) methyl amino]-2-hydroxypropanesulfonic acid.

Having generally described the invention, the following EXAMPLES provide additional details.

EXAMPLE 1

Figure 5:
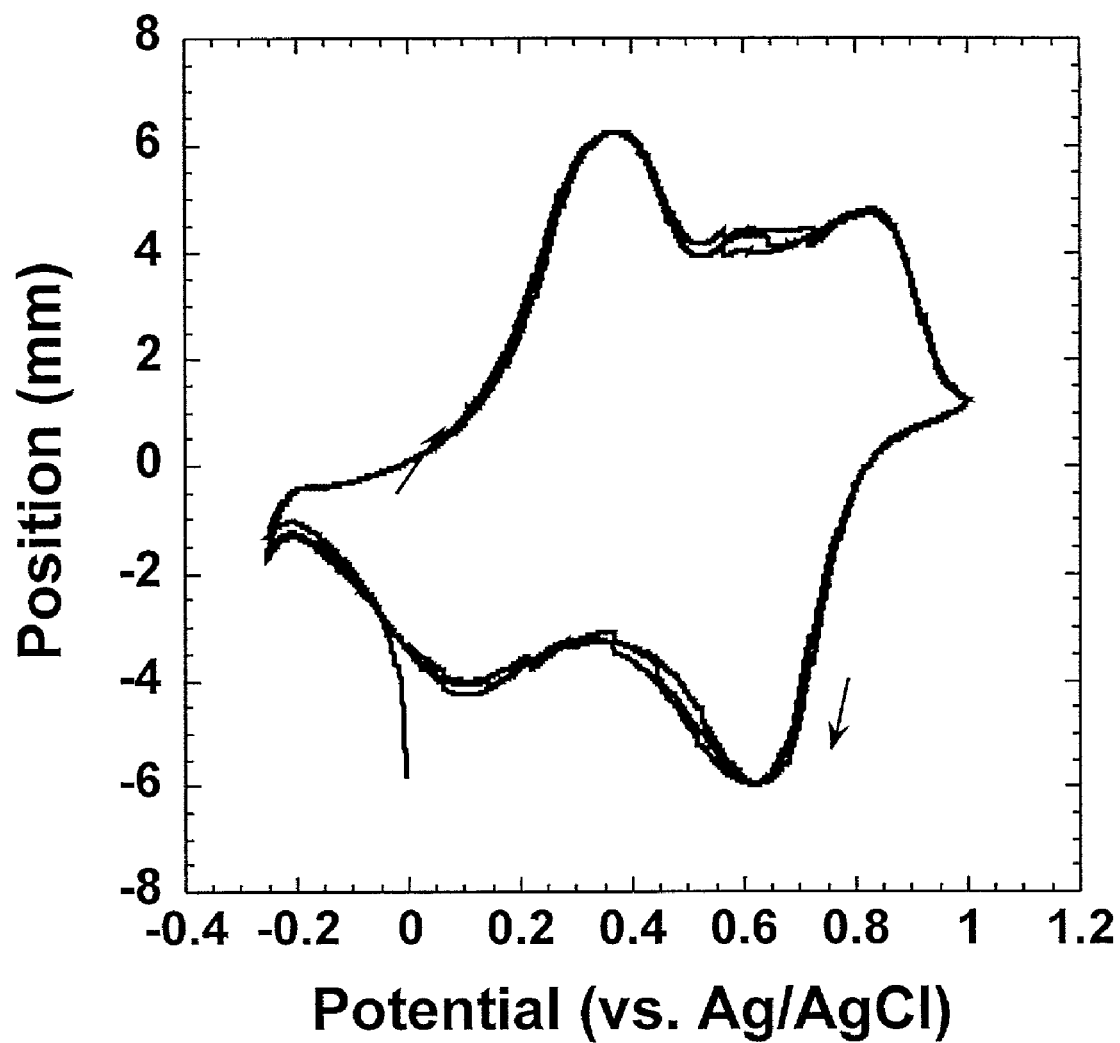
FIG. 5 shows cyclic voltammograms of a high conductivity stretched polyaniline/AMPSA film (~400 S/cm) obtained in 1 M HCl with a potential scan range between −0.25 and 0.50 V (vs. Ag/AgCl), and a scan rate of 50 mV/s.

A. Cyclic Voltammetry of PANI/AMPSA in 1 M HCl:

A PANI/AMPSA film (high conductivity material) with a thickness of approximately 15 $\mu$m was produced using the method described above. The stretched film was cut into strips approximately 1–2 mm wide and 3 cm long. The strip was immersed into a 1 M HCl aqueous solution and clamped at the bottom and affixed to the mechanical measurement arm as described above. Cyclic voltammograms were recorded by a potentiostat between −0.25 and +0.5 V. The scan rate was 50 mV/s. FIGS. 5 through 8 compare the cyclic voltammograms of low-conductivity polyaniline (~30 S/cm) and high-conductivity polyaniline/AMPSA (~400 S/cm) films in 1M HCl. In FIG. 5, the two oxidation peaks show the conversion of the leucoemeraldine to the emeraldine state and the conversion from the emeraldine to the pernigraniline state. The two reduction peaks show the conversion from the pernigraniline to the emeraldine state and the conversion from the emeraldine state to the leucoemeraldine state.

Figure 6:
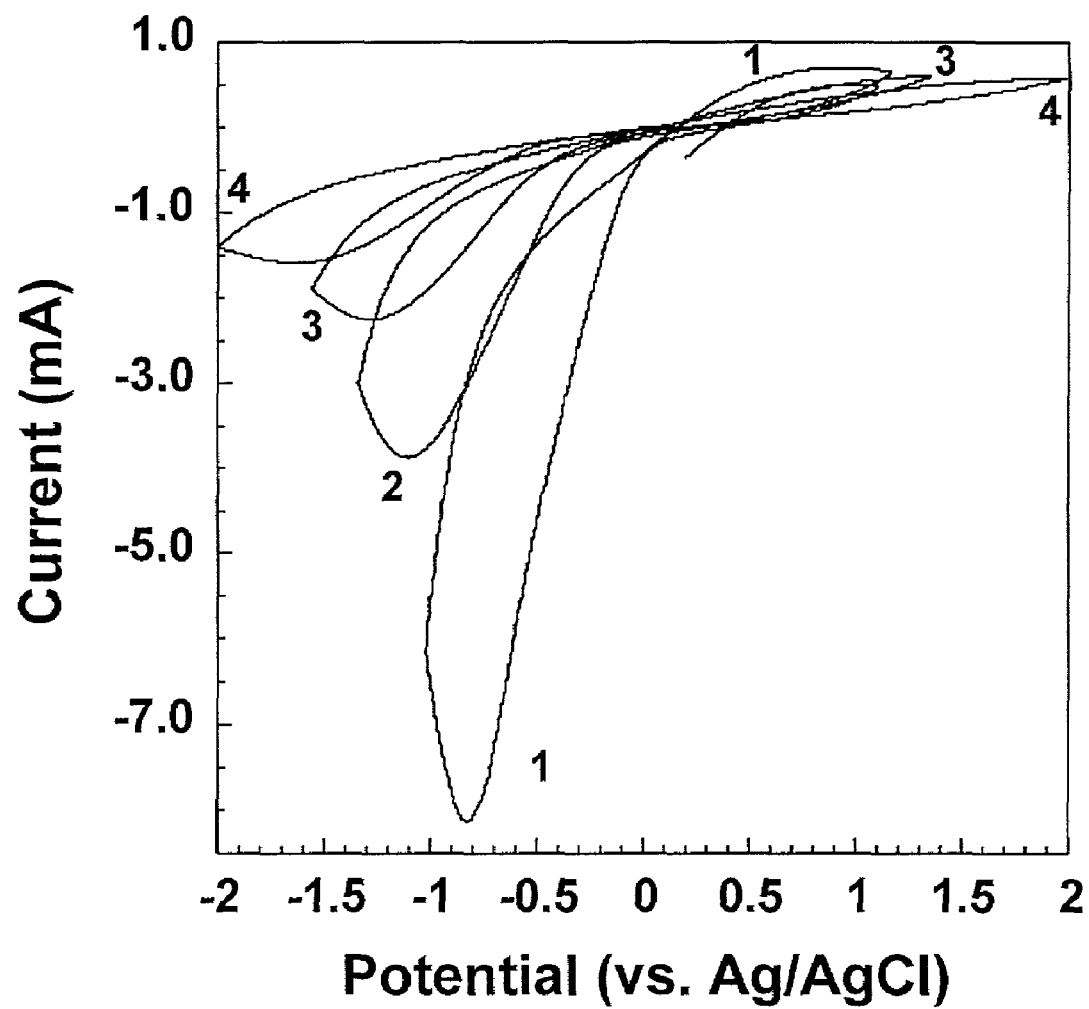
FIG. 6 shows cyclic voltammograms of a low conductivity (30 S/cm) free standing PANI film obtained in 1.0 M HCl with a potential scan range between −2.0 and 2.0 V (vs. Ag/AgCl), and a scan rate of 100 mV/s.

B. Cyclic Voltammetry of PANI in 1 M HCl:

A strip was cut from a film of polyaniline in the emeraldine base form. It was immersed into 1 M HCl before use to dope/protonate it to the emeraldine salt form, giving a low conductivity of ~30 S/cm. It was clamped using an alligator clip, and the lower portion, ~1.5 cm in length, was immersed into a 1 M HCl electrolyte. Counter and reference electrodes were also immersed in the electrolyte. Cyclic voltammograms were recorded between −2 and +2 V at a scan rate of 100 mV/s. The cyclic voltammogram of the low-conductivity film is shown in FIG. 6. Even at a potential as high as ±2 V, only the first set of peaks is seen. Furthermore, at these high potentials, the materials decays rapidly with cycle number, as shown by the decreasing size and increasing separation of the oxidation and reduction peaks. FIGS. 5 and 6 clearly show the importance of high conductivity: it is impossible to perform electrochemistry with films having low conductivity without going to very high potentials that damage the film.

Figure 7:
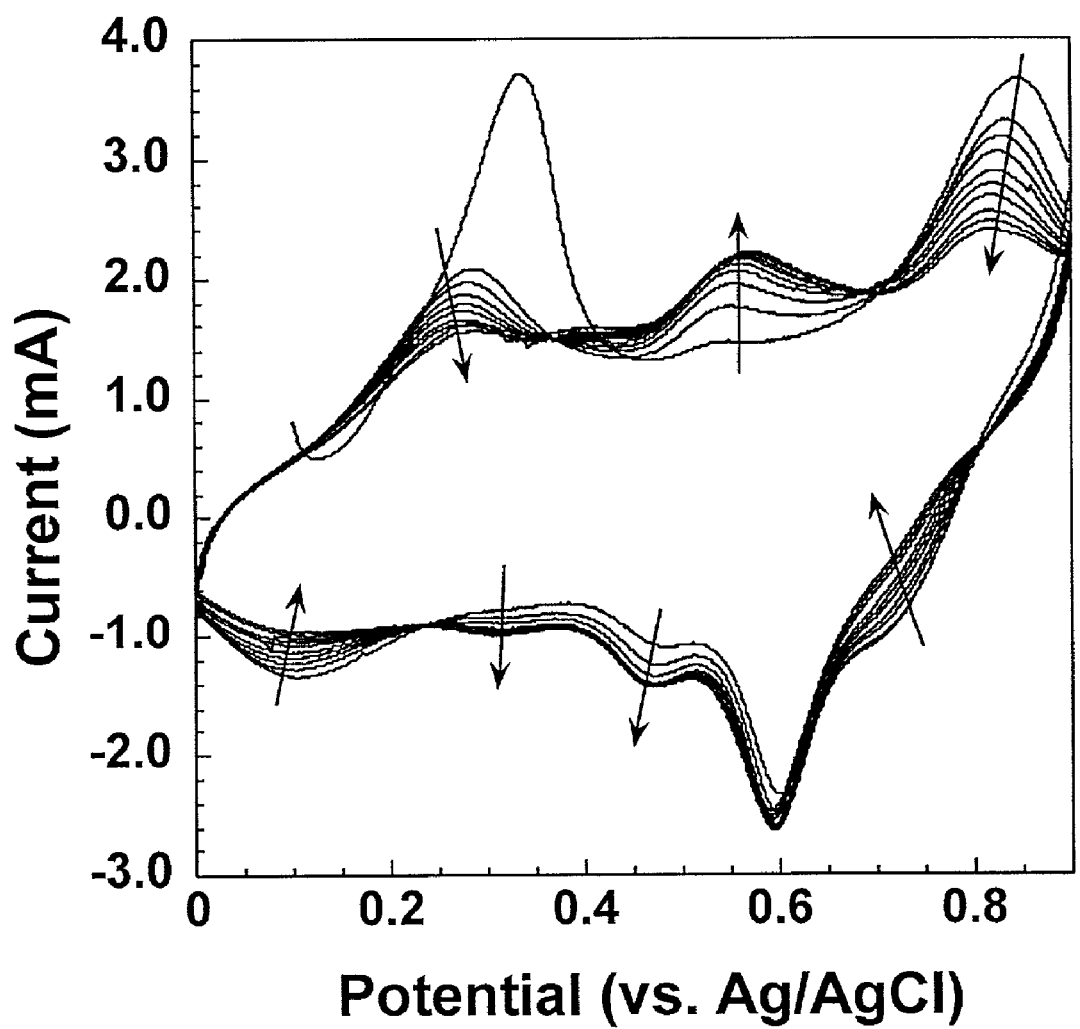
FIG. 7 shows three cyclic voltammograms of a low conductivity (~30 S/cm) polyaniline film with a gold backing obtained in 1.0 M HCl, with a potential scan range between 0 and 0.9 V (vs. Ag/AgCl), and a scan rate of 10 mV/s.

C. Cyclic Voltammetry of Gilded PANI in 1 M HCl:

Low conductivity films are capable of undergoing oxidation/reduction if they have a conductive backing. A piece of low conductivity polyaniline (~30 S/cm when doped using HCl) in the emeraldine base form was gilded as described above. A strip was cut from the gilded film and immersed into 1 M HCl before use for ~30 min. to dope/protonate it to the emeraldine salt form. It was clamped using an alligator clip and the lower portion was immersed into a 1 M HCl electrolyte. Counter and reference electrodes were also immersed in the electrolyte. Cyclic voltammograms were recorded between 0 and +0.9 V at a scan rate of 10 mV/s. The cyclic voltammograms are shown in FIG. 7. With a gold film in contact with the entire area of the PANI, good cyclic voltammograms could be obtained. However, gilded films do not undergo lineal extension, but bending, which is disadvantageous. Furthermore, the gold film can corrode, crack, or peel off, and the gilding takes additional time and considerable expense because the metals that can be used are gold and platinum, both of which are expensive.

Figure 8:
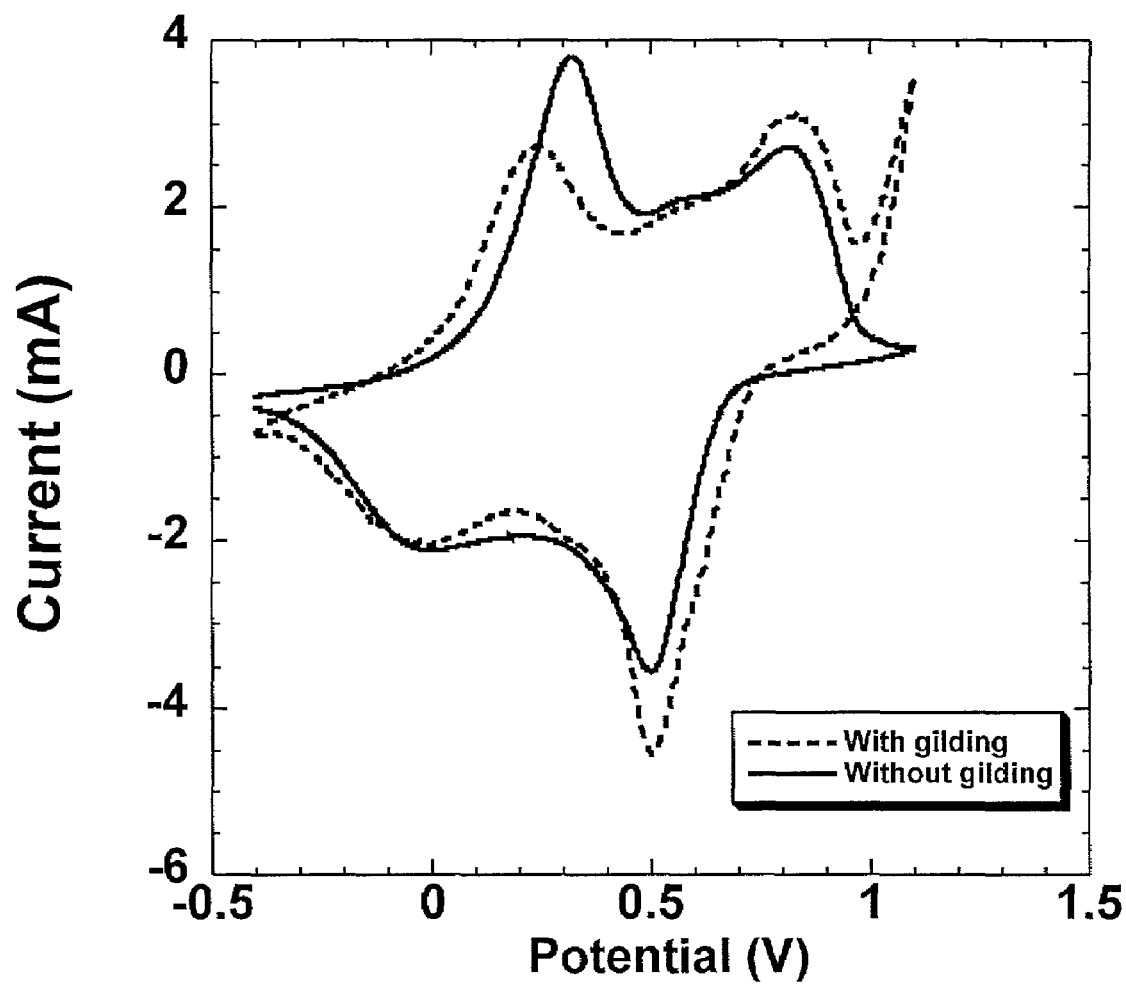
FIG. 8 compares cyclic voltammograms of high conductivity (~400 S/cm) stretched PANI/AMPSA films with (solid) and without (dashed) a gold backing obtained in 1.0M HCl with a potential scan range between −0.4 and 1.1 V (vs. Ag/AgCl), and a scan rate of 50 mV/s.

D. Cyclic Voltammetry of PANI/AMPSA with and without Gilding in 1 M HCl:

A piece of stretched PANI/AMPSA film with a thickness of approximately 15 $\mu$m was gilded as described above. A strip 1 mm wide and 1.2 cm long was cut from the gilded film. It was clamped using an alligator clip, and the lower potion, 1 cm in length, was immersed into a 1 M HCl electrolyte. Counter and reference electrodes were also immersed in the electrolyte. Cyclic voltammograms were recorded between −0.4 and +1.1 V (vs. Ag/AgCl) at a scan of 50 mV/s. Under the same conditions, the cyclic voltammograms were also recorded for an identical ungilded strip of PANI/AMPSA film. The cyclic voltammograms are shown in FIG. 8. The curves with and without the gold backing for stretched films of PANI/AMPSA are nearly identical. (The oxidation peak observed for the gilded film above +1 V is due to the oxidation of gold.) This shows that high conductivity films do not need a metal backing.

EXAMPLE 2

Volume Change of PANI/AMPSA in 1 M HCl:

Without electrochemical oxidation/reduction reactions, no volume change occurs in conjugated polymers. This will be further illustrated in the examples below. With oxidation/reduction, volume change can occur. A strip of stretched PANI/AMPSA prepared as described above was cut into a strip 2 mm×3 cm. It was affixed to the mechanical measurement arm as described above. Approximately 1 cm of the strip was immersed in a 1 M HCl electrolyte. Cyclic voltammograms were recorded between −0.2 and 1 V (vs.

Figure 9:
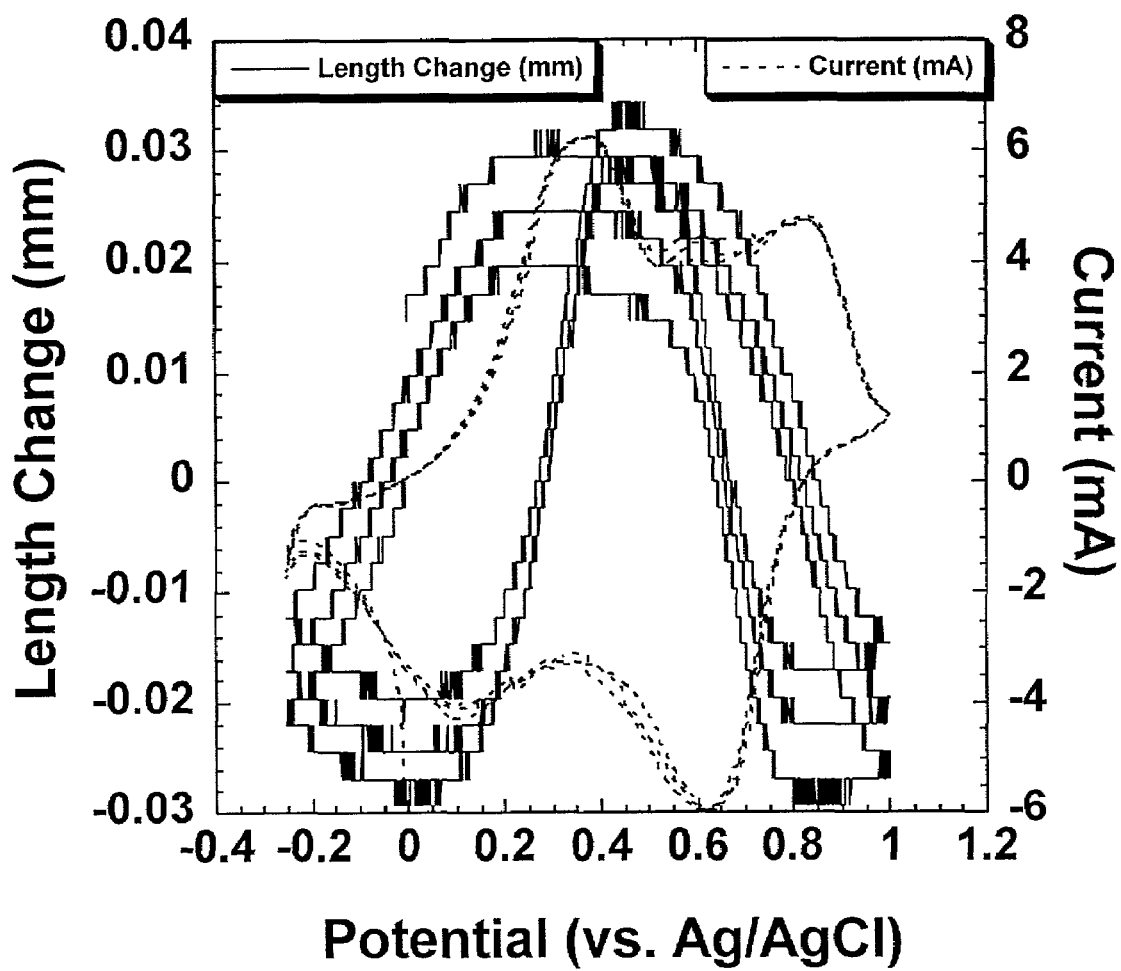
FIG. 9 shows the length change (solid black lines) and current (dashed lines) of high conductivity (~400 S/cm) PANI(AMPSA) sample in 1 M HCl during 3 cycles of an isotonic length measurement with a constant weight of 5 g, with a potential scan range between −0.2 and 1.0 V (vs. Ag/AgCl), and a scan rate of 50 mV/s.

Ag/AgCl) at a scan rate of 50 mV/s. A constant 5 g force was applied to the strip, and the change in elongation was measured. The high conductivity PANI/AMPSA underwent lineal extension/contraction, as shown in FIG. 9. The film elongated during the first oxidation process, in which the film went from the leucoemeraldine to the emeraldine state. It contracted during the second oxidation process, in which it went to the pernigraniline state. This demonstrates that a free-standing high conductivity film (that is, without a metal backing to increase conductivity) can be used as a lineal extension actuator.

EXAMPLE 3

Figure 10:
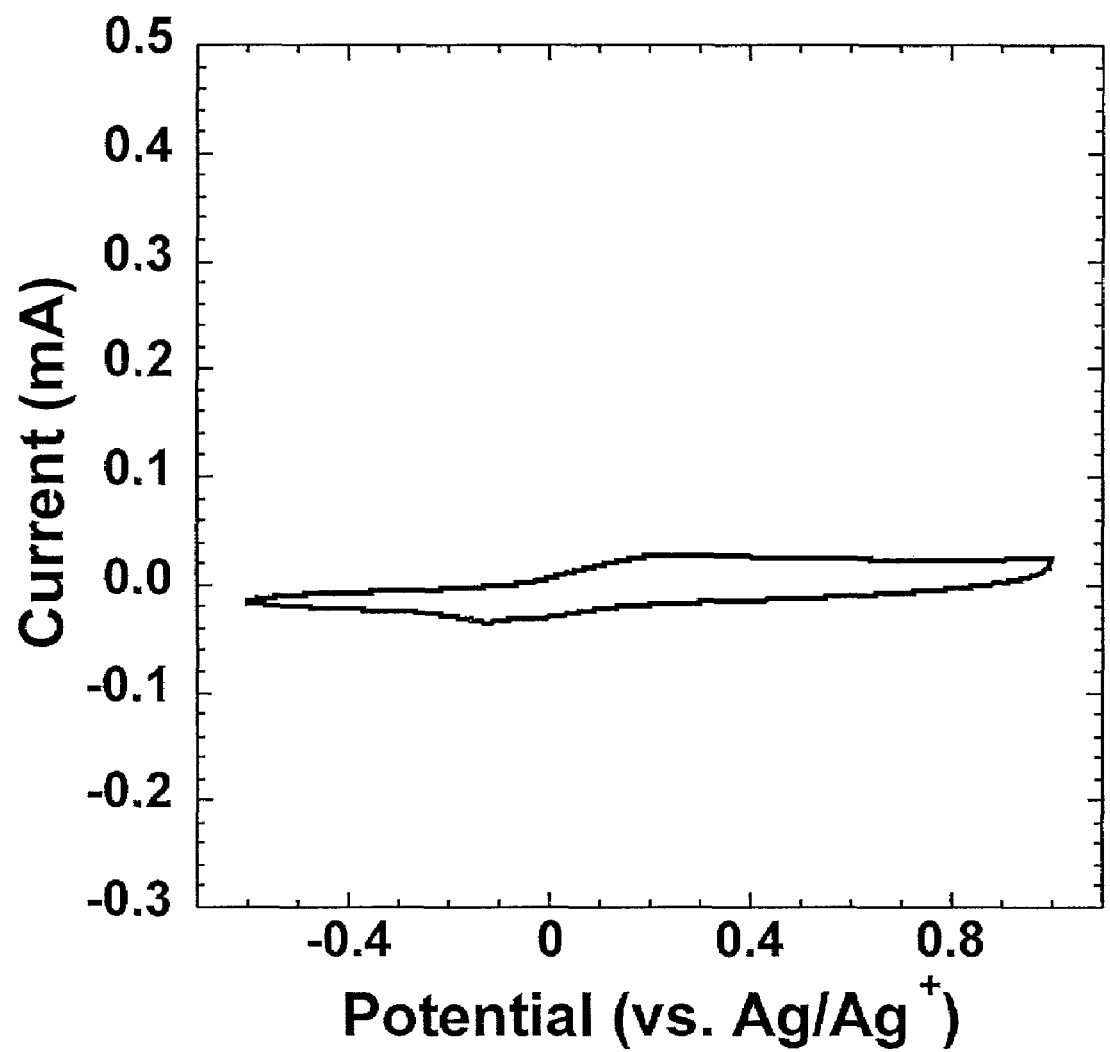
FIG. 10 shows a cyclic voltammogram of a high conductivity (~400 S/cm) stretched PANI/AMPSA sample in 1 M PC/LiClO$_4$, with a potential scan range between −0.6 and +1 V (vs. Ag/Ag$^+$), and a scan rate of 5 mV/s.
Figure 11:
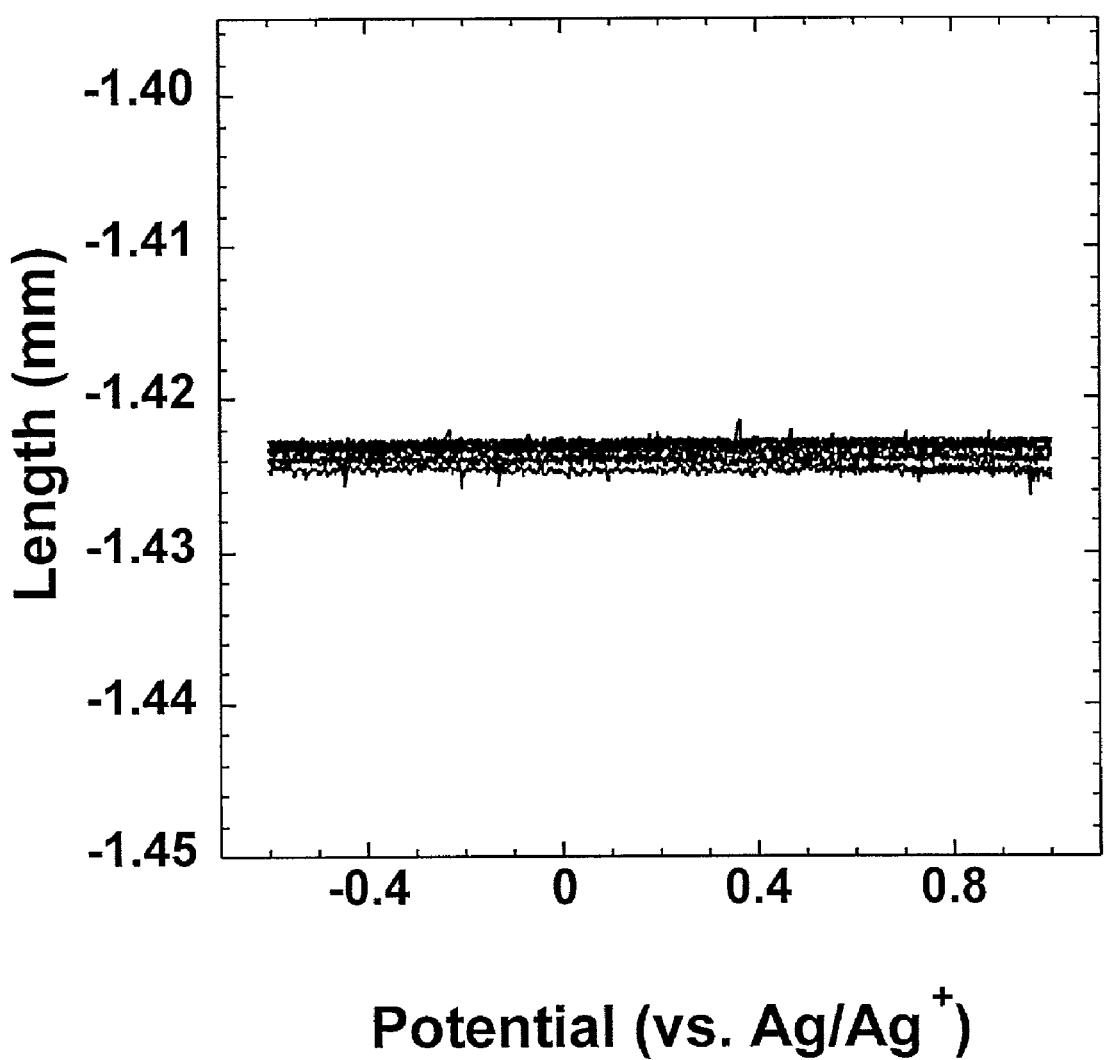
FIG. 11 shows four scans of the length change of the PANI/AMPSA sample of FIG. 10 in 1 M PC/LiClO$_4$ during cyclic voltammetry with a potential scan range between −0.6 and +1 V (vs. Ag/Ag$^+$), with a scan rate of 5 mV/s.

A. Cyclic Voltammetry and Linear Extension of PANI/AMPSA in 1 M LiClO4 in PC:

A strip of stretched PANI/AMPSA film prepared as described above was cut into a strip 1 mm×3 cm. It was affixed to the mechanical measurement arm as described above. Approximately 1 cm of the strip was immersed in a 1 M LiClO$_4$/PC electrolyte. Cyclic voltammograms were recorded between −0.6 and 1 V (vs. Ag/Ag$^+$) at a scan rate of 5 mV/s. A constant 2.5 g force was applied to the strip, and the change in elongation was measured. Cyclic voltammograms and length change are shown in FIG. 10 and FIG. 11. The electrochemical oxidation and reduction of polyaniline is accompanied by ion transport that maintains charge neutrality. AMPSA is insoluble in PC, so it does not exit the polymer when reducing potentials are applied. This prevents the reduction reaction from taking place. This is shown in FIG. 10: there is almost no current recorded during the cyclic voltammogram. There is also essentially no length change, as seen in FIG. 11.

Figure 12:
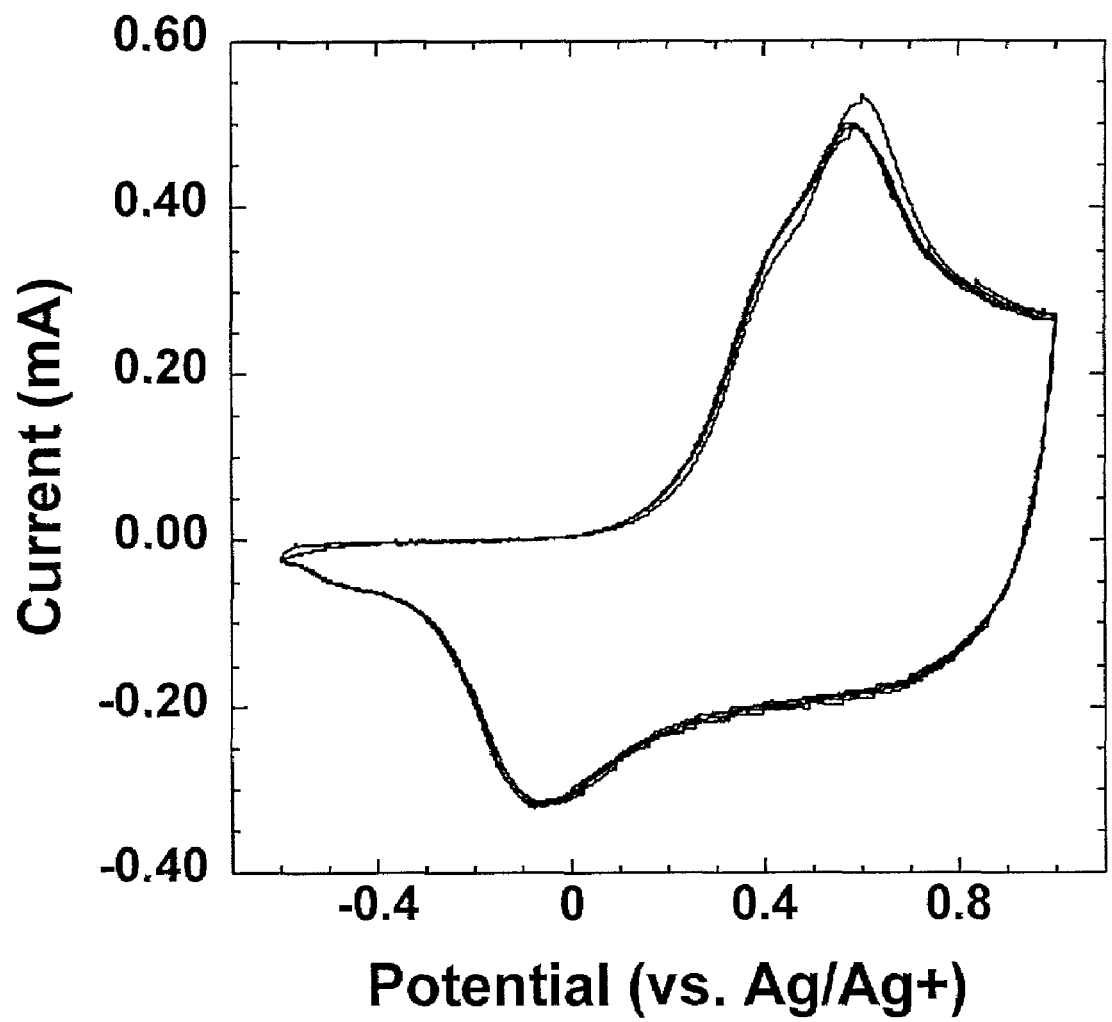
FIG. 12 shows cyclic voltammograms of a stretched PANI/AMPSA sample treated in 1 M trifluoromethanesulfonic acid for 24 h before cycling in 1 M PC/LiClO$_4$, with a potential scan range between −0.6 and +1 V (vs. Ag/Ag$^+$), and a scan rate of 5 mV/s.
Figure 13:
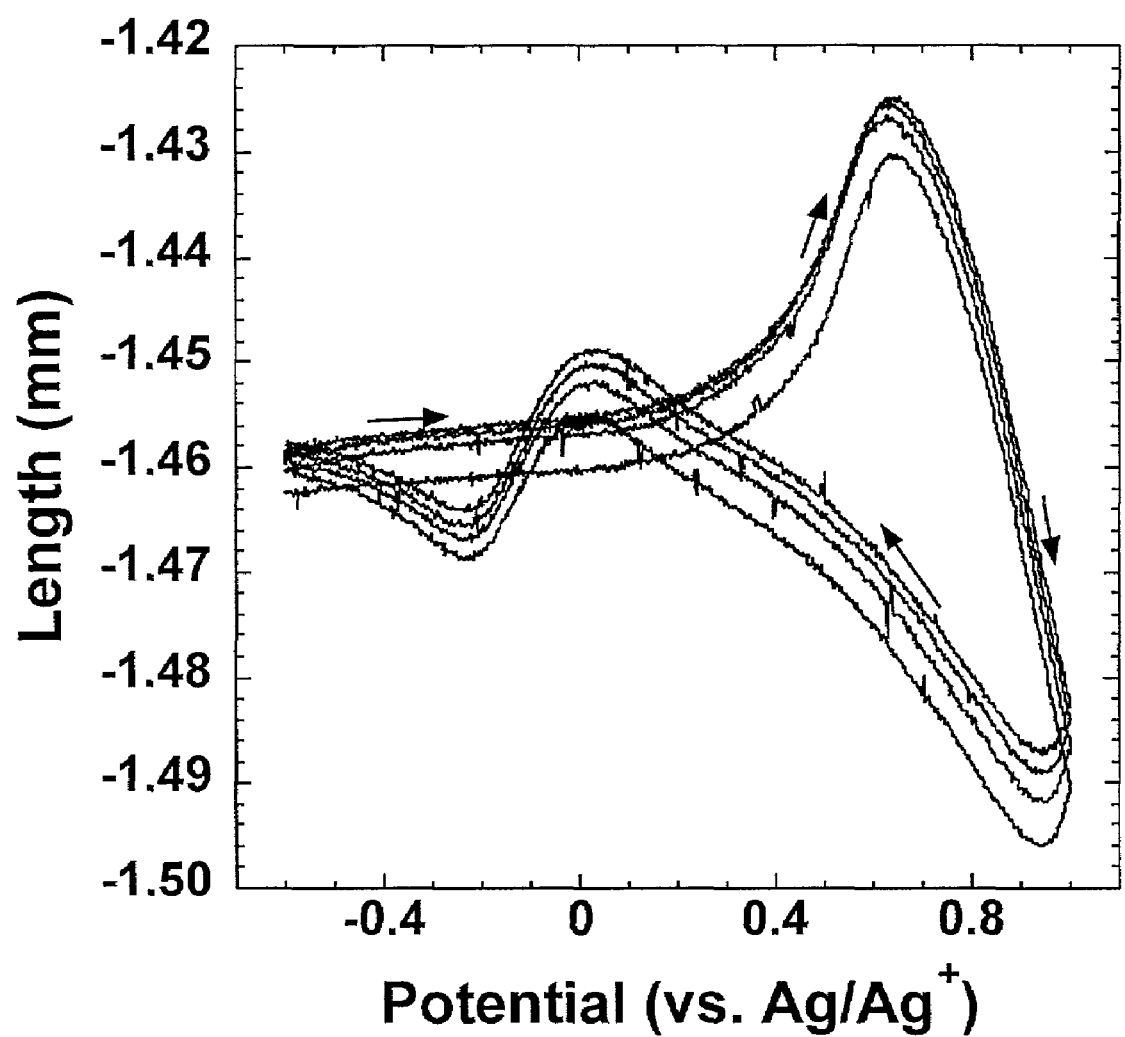
FIG. 13 shows four scans of the length change of a stretched PANI(AMPSA) sample treated in 1 M trifluoromethanesulfonic acid for 24 h before cycling in 1 M PC/LiClO$_4$, with a potential scan range between −0.6 and +1 V (vs. Ag/Ag$^+$), and a scan rate of 5 mV/s.

B. Cyclic Voltammetry and Linear Extension of PANI/AMPSA Treated in 1 M Triflic Acid Before Cycling in 1 M LiClO4 in PC:

In order to replace AMPSA with another dopant soluble in PC (for example, triflate anions), three approaches were used. In the first method, PANI/AMPSA was soaked in 1 M triflic acid for 24 to 72 h. In the second method, the film was dedoped and redoped: PANI/AMPSA was firstly dedoped in 10% ammonium hydroxide for 1 h and then redoped in 1 M triflic acid for 24 h. In the third method, the film was cycled electrochemically in aqueous 1 M triflic acid for 20 to 40 cycles at a scan rate of 20 mV/s and then held at 0.55 V for 6 min. to reach a steady current to ensure the conductive state of emeraldine salt was achieved. Prior to measurements in 1 M LiClO$_4$/PC, the treated film was rinsed with water and then dried under dynamic vacuum for 24 h. A film of stretched PANI/AMPSA 1 mm×3 cm was treated with the method of redoping in 1 M triflic acid for 24 h as described above. It was then affixed to the mechanical measurement arm as described above. Approximately 1 cm of the strip was immersed in a 1 M LiClO$_4$/PC electrolyte. Cyclic voltammograms were recorded between −0.6 and 1 V (vs. Ag/Ag$^+$) at a scan rate of 5 mV/s. A constant 2.5 g force was applied to the strip, and the change in elongation was measured. Cyclic voltammograms and length change are shown in FIG. 12 and FIG. 13.

Figure 14:
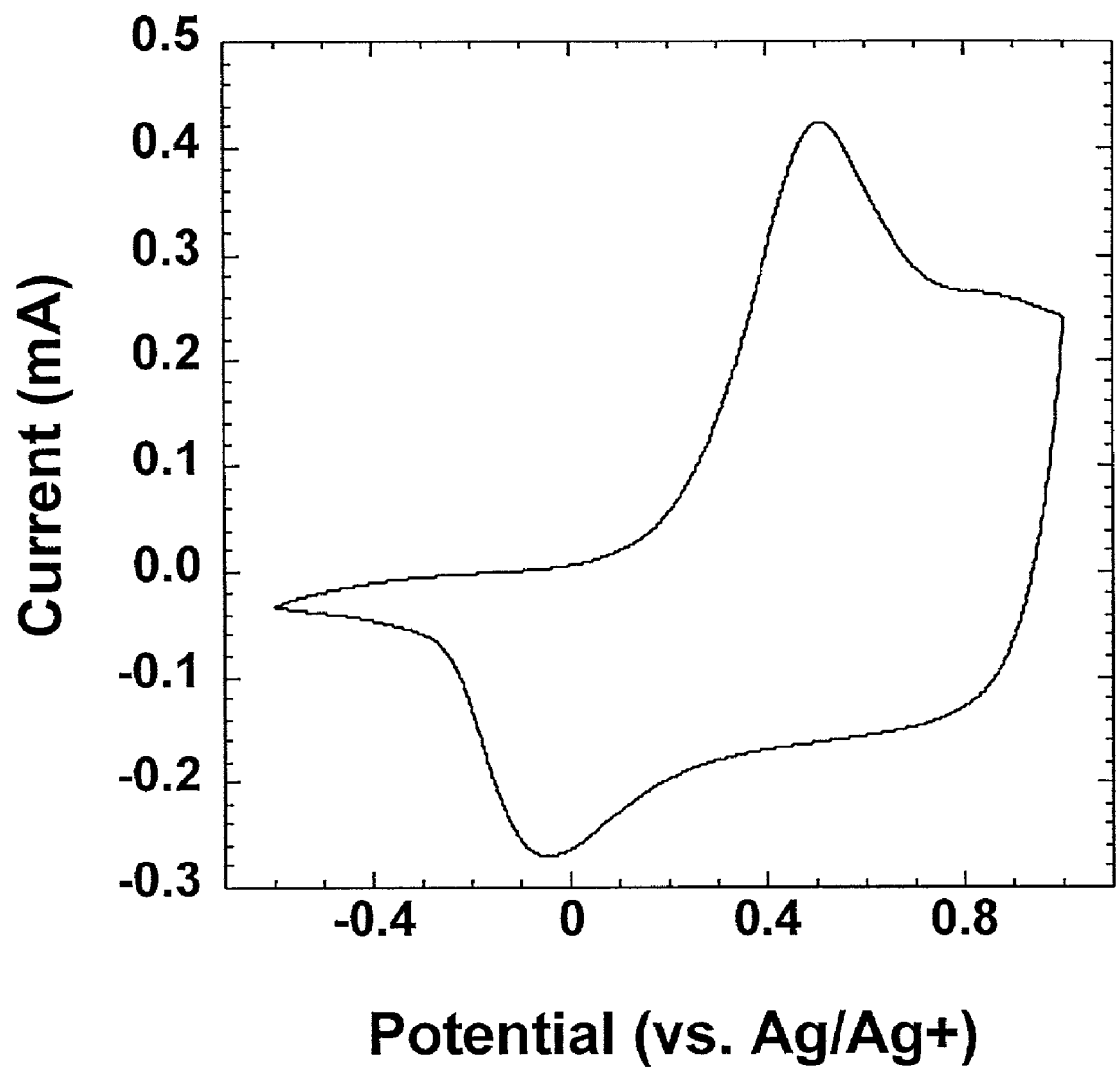
FIG. 14 shows a cyclic voltammogram of a stretched PANI/AMPSA sample treated in 10% NH$_4$OH for 1 h and then in 1 M trifluoromethanesulfonic acid for 24 h before cycling in 1 M PC/LiClO$_4$, with a potential scan range between −0.6 and +1 V (vs. Ag/Ag$^+$), and a scan rate of 5 mV/s.
Figure 15:
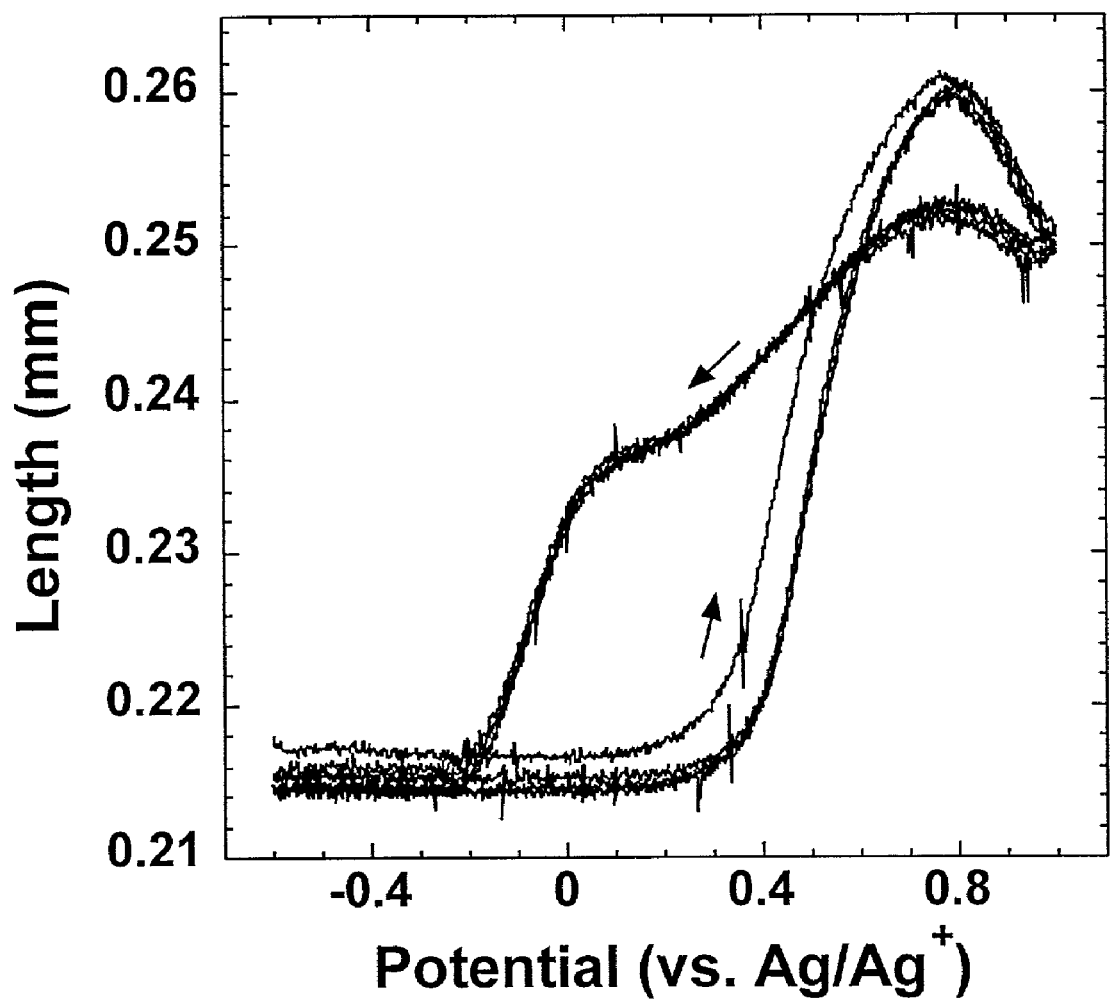
FIG. 15 shows four scans of the length change of a stretched PANI(AMPSA) sample treated in 10% NH$_4$OH for 1 h and then in 1 M trifluoromethanesulfonic acid for 24 h before cycling in 1 M PC/LiClO$_4$, with a potential scan range between −0.6 and +1 V (vs. Ag/Ag$^+$), and a scan rate of 5 mV/s.

A film of stretched PANI/AMPSA 1 mm×3 cm was treated with the method of dedoping-redoping as described above. It was then affixed to the mechanical measurement arm as described above. Approximately 1 cm of the strip was immersed in a 1 M LiClO$_4$/PC electrolyte. Cyclic voltammograms were recorded between −0.6 and 1 V (vs. Ag/Ag$^+$) at a scan rate of 5 mV/s. A constant 2.5 g force was applied to the strip, and the change in elongation was measured. Cyclic voltammograms and length change are shown in FIG. 14 and FIG. 15.

Figure 16:
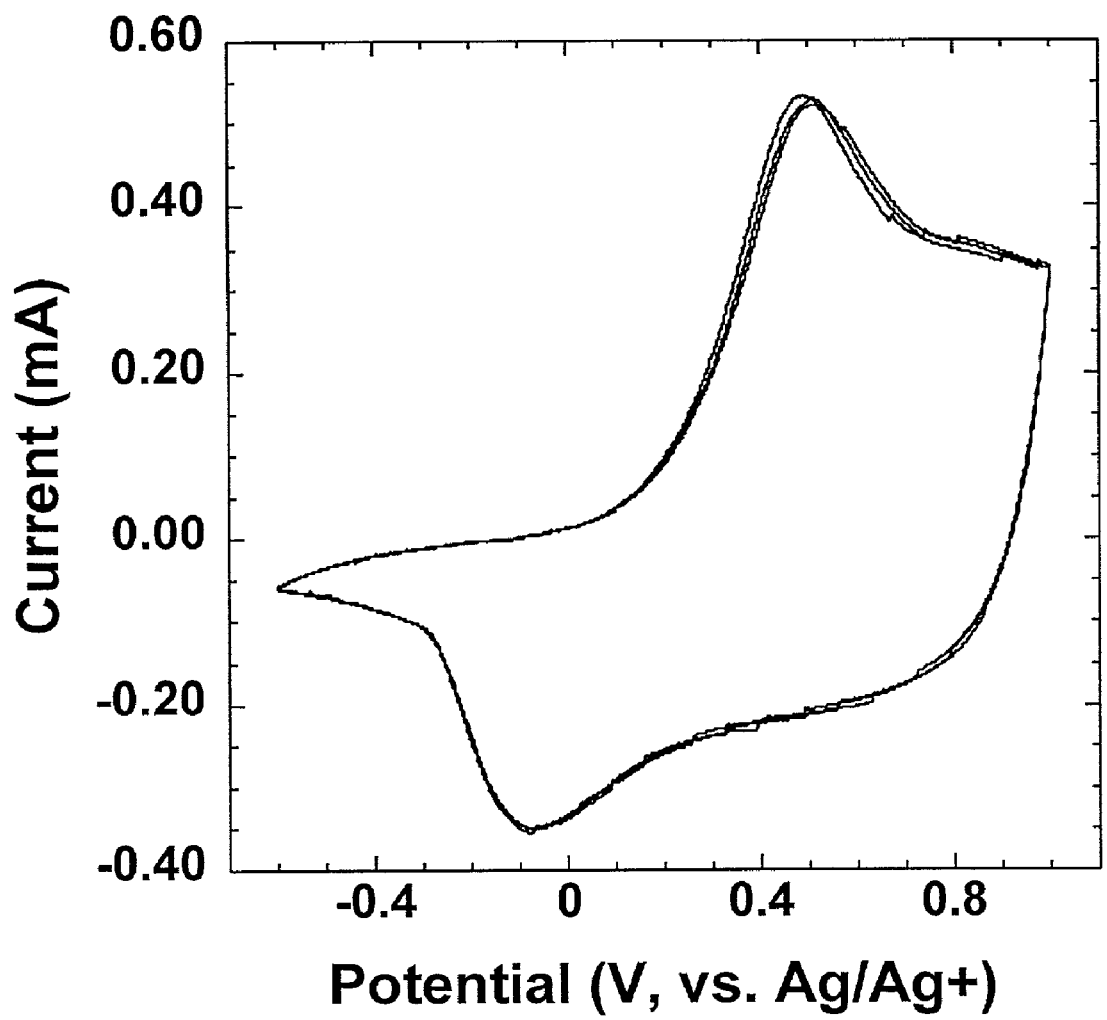
FIG. 16 shows cyclic voltammograms of a stretched PANI/AMPSA sample cycled in 1 M trifluoromethanesulfonic acid between −0.2 V and 0.55 V at 20 mV/s for 40 cycles and then held at 0.55 V for 6 min. before cycling in 1 M PC/LiClO$_4$, with a potential scan range between −0.6 and +1 V (vs. Ag/Ag$^+$), and a scan rate of 5 mV/s.
Figure 17:
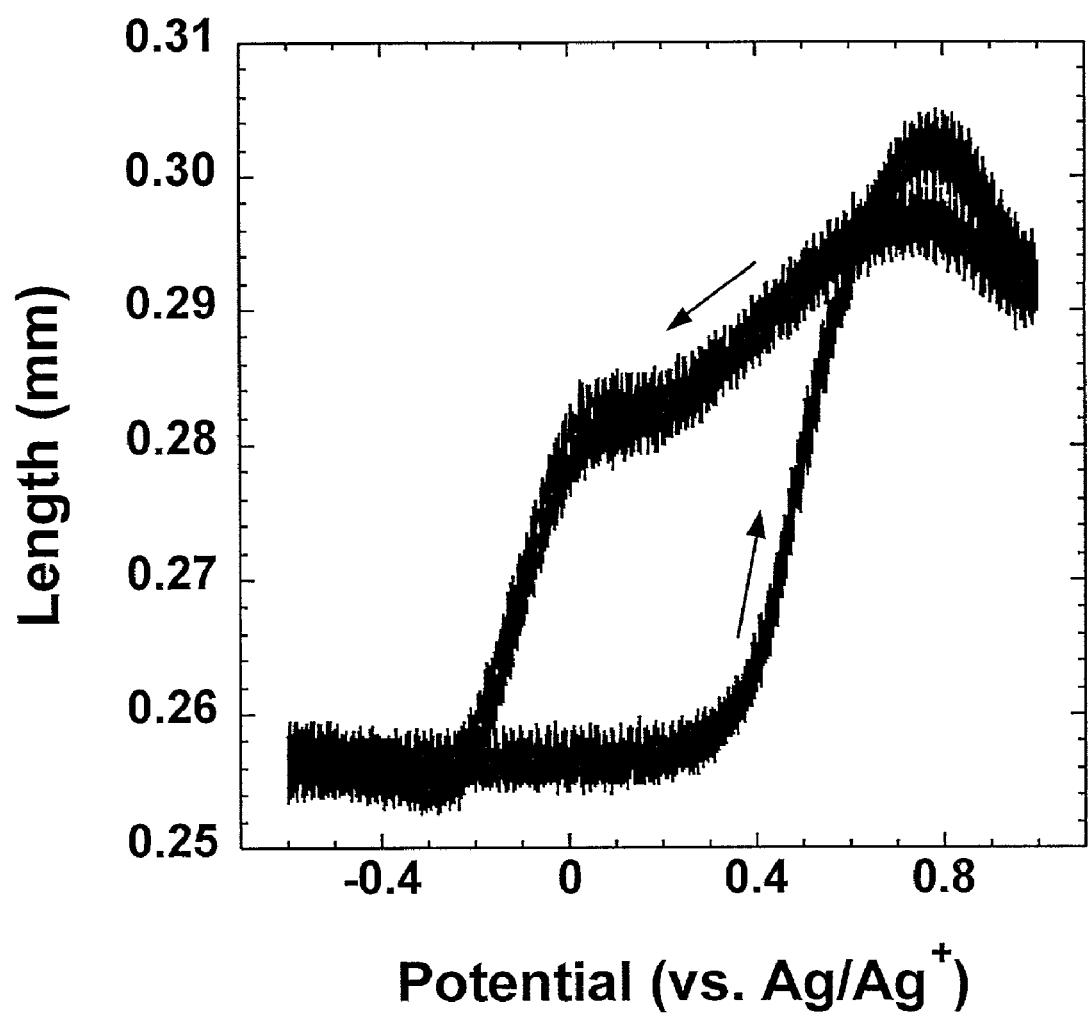
FIG. 17 shows four scans of the length change of a stretched PANI(AMPSA) sample cycled in 1 M trifluoromethanesulfonic acid between −0.2 V and 0.55 V at 20 mV/s for 40 cycles and then held at 0.55 V for 6 min. before cycling in 1 M PC/LiClO$_4$, with a potential scan range between −0.6 and +1 V (vs. Ag/Ag$^+$), and a scan rate of 5 mV/s.

A film of stretched PANI/AMPSA 1 mm×3 cm was treated with the method of electrochemical redoping as described above. It was then affixed to the mechanical measurement arm as described above. Approximately 1 cm of the strip was immersed in a 1 M LiClO$_4$/PC electrolyte. Cyclic voltammograms were recorded between −0.6 and 1 V (vs. Ag/Ag$^+$) at a scan rate of 5 mV/s. A constant 2.5 g force was applied to the strip, and the change in elongation was measured. Cyclic voltammograms and length change are shown in FIG. 16 and FIG. 17.

Treating the PANI/AMPSA in aqueous triflic acid with any of the three methods described above results in a replacement of the AMPSA anions by triflate anions. Triflate anions are soluble in PC, so these anions exit the polyaniline during reduction, and then re-enter during oxidation. FIG. 10 and FIG. 11 show that little oxidation/reduction takes place before replacement of AMPSA by triflate, and no volume change. FIGS. 12 through 17 show that both oxidation/reduction and volume change occur after any of the three treatments in triflic acid and demonstrate the importance of anion solubility for electrochemical devices.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

REFERENCES

1. P. Chiarelli and D. De Rossi, patent IT 1235887, "Materiale composito contrattile e dispositivi elettromeccanochimici che lo utilizzano, in particolare muscoli artificiali e dispositivi sensori," Italy (1992).
2. K. Kaneto, Y. Min, and A. G. MacDiarmid, U.S. Pat. No. 5,556,700, "Conductive polyaniline laminates," USA (1996).
3. K. Kaneto, S. Sewa, and W. Takashima, patent EU 98310231, "Artificial muscles," Europe (1999).
4. W. S. Huang, B. D. Humphrey, and A. G. MacDiarmid, "Polyaniline, a novel conducting polymer," J. Chem. Soc., Faraday Trans. 1 82, 2385–400 (1986).
5. A. Mazzoldi, C. Degl'lnnocenti, M. Michelucci, and D. De Rossi, "Actuative properties of polyaniline fibers under electrochemical stimulation," Mat. Sci. Eng. C 6 (1), 65–72 (1998).
6. M. Satoh, K. Kaneto, and K. Yoshino, "Dependences of electrical and mechanical properties of conducting polypyrrole films on conditions of electrochemical polymerization in an aqueous medium," Synth. Met. 14, 289 (1986).
7. M. Kaneko and K. Kaneto, "Electrochemomechanical deformation of polyaniline films doped with self-existent and giant anions," React. Funct. Polym. 37, 155–61 (1998).
8. T. W. Lewis, G. M. Spinks, G. G. Wallace, D. De Rossi, and M. Pachetti, "Development of an all polymer electromechanical actuator," Polym. Prep. 38, 520 (1997).

9. Q. Pei, O. Inganäs, and 1. Lundström, "Bending bilayer strips built from polyaniline for artificial electrochemical muscles," Smart Mater. Struct. 2, 1–6 (1993).
10. E. Smela, O. Inganäs, and 1. Lundström, "Controlled folding of micrometer-size structures," Science 268 (23 June), 1735–8 (1995).
11. T. F. Otero, J. Rodriguez, E. Angulo, and C. Santamaria, "Artificial muscles from bilayer structures," Synth. Met. 55–57, 3713–7 (1993).
12. M. Kaneko, M. Fukui, W. Takashima, and K. Kaneto, "Electrolyte and strain dependences of chemomechanical deformation of polyaniline film," Synth. Met. 84, 795–6 (1997).
13. P. Chiarelli, A. Della Santa, D. De Rossi, and A. Mazzoldi, "Actuation properties of electrochemically driven polypyrrole free-standing films," J. Intell. Mater. Syst. Struct. 6 (January), 32 (1995).
14. W. Takashima, M. Fukui, M. Kaneko, and K. Kaneto, "Electrochemomechanical deformation of polyaniline films," Jpn. J. Appl. Phys. 34, 3786 (1995).
15. A. P. Monkman and P. Adams, "Optical and electronic properties of stretch-oriented solution-cast polyaniline films," Synth. Met. 40, 87–96 (1991).
16. M. Kaneko and K. Kaneto, "Electrochemomechanical deformation in polyaniline and poly(o-methoxyalinine)," Synth. Met. 102, 1350–53 (1999).
17. A. Della Santa, D. De Rossi, and A. Mazzoldi, "Performances and work capacity of a polypyrrole conducting polymer linear actuator," Synth. Met. 90, 93 (1997).
18. W. Takashima, T. Uesugi, M. Fukui, M. Kaneko, and K. Kaneto, "Mechanochemoelectrical effect of polyaniline film," Synth. Met. 85 (1–3), 1395–6 (1997).
19. K. Okabayashi, F. Goto, K. Abe, and T. Yoshida, "Electrochemical studies of polyaniline and its application," Synth. Met. 18, 365–70 (1987).
20. P. N. Adams, P. Devasagayam, S. J. Pomfret, L. Abell, and A. P. Monkman, "A new acid-processing route to polyaniline films which exhibit metallic conductivity and electrical transport strongly dependent upon intrachain molecular dynamics," J. Phys.: Condens. Matter 10, 8293–303 (1998).

What is claimed is:

1. An electrochemical actuator comprising a high-conductivity conjugated polymer element other than a polypyrrole element having an electrical conductivity of $\geq 150$ S/cm, wherein said element actuates by linear extension/contraction.

2. The electrochemical actuator as described in claim 1, wherein the high-conductivity conjugated polymer is prepared from a monomer selected from the group consisting of aniline, thiophene, phenylene vinylene, and derivatives thereof.

3. The electrochemical actuator as described in claim 2, wherein the derivatives comprise derivatives that generate high-conductivity conjugated polymers when polymerized.

4. The electrochemical actuator as described in claim 3, wherein the derivatives are selected from the group consisting of C1–C10 alkyl-, C1–C10 alkoxy-, halo-, nitro-, cyano-, and ester-substituted monomers.

* * * * *